United States Patent
Schwartz et al.

(10) Patent No.: US 9,710,308 B1
(45) Date of Patent: Jul. 18, 2017

(54) WORKFLOW FOR MIGRATION PLANNING OF DATA STORAGE SYSTEMS

(71) Applicant: EMC Corporation, Hopkinton, MA (US)

(72) Inventors: Michael Schwartz, Hamden, CT (US); Jody Hay, Buford, GA (US); Karen Murphy, Cork (IE); Fergal Gunn, Cork (IE); David Bowden, Cork (IE); Benjamin David, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 768 days.

(21) Appl. No.: 14/140,135

(22) Filed: Dec. 24, 2013

(51) Int. Cl.
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/4837* (2013.01); *G06F 9/5088* (2013.01); *G06F 2209/486* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 2003/0093444 | A1* | 5/2003 | Huxoll | G06F 11/1471 |
| 2006/0112247 | A1* | 5/2006 | Ramany | G06F 3/0605 711/165 |
| 2006/0224432 | A1* | 10/2006 | Li | G06Q 10/06 705/7.21 |
| 2012/0311603 | A1* | 12/2012 | Kudo | G06F 3/0611 718/105 |
| 2013/0339956 | A1* | 12/2013 | Murase | G06F 9/505 718/1 |
| 2014/0207920 | A1* | 7/2014 | Hirana | H04L 41/0813 709/220 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Tammy Lee
(74) *Attorney, Agent, or Firm* — Ryan, Mason & Lewis, LLP

(57) ABSTRACT

Techniques for improved workflow for migration planning of data storage systems. For example, a method comprises the following steps. A plurality of elements representing events of a workflow are generated, wherein each element is active for a predetermined duration. A group of one or more assets to be migrated as a unit are assigned to each element. A group of the one or more assets is moved from a first element of the plurality of elements to a second element of the plurality of elements.

23 Claims, 25 Drawing Sheets

FIG. 5

Project7   507
NASArray1
NASArray2

EventWindow14   514
1st July 2013 – 5th July 2013 (5 days)
NASArray1 (fileSystem1-1, fileSystem1-2, fileSystem1-3, fileSystem1-4, fileSystem1-5)
NASArray2 (fileSystem2-1, fileSystem2-2, fileSystem2-3, fileSystem2-4, fileSystem2-5)

> MigrationGroup14-1   524
> Assets: NASArray1, NASArray2
> fileSystem1-1 to fileSystem2-1
> fileSystem1-2 to fileSystem2-2
> fileSystem1-3 to fileSystem2-3
> fileSystem1-4 to fileSystem2-4
> fileSystem1-5 to fileSystem2-5

EventWindow15   515
6th July 2013 – 27 July 2013 (3 weeks)
NASArray1 (fileSystem1-1, fileSystem 1-2)
NASArray2 (fileSystem2-1, fileSystem 2-2)

> MigrationGroup15-1   525
> Assets: NASArray1, NASArray2
> fileSystem1-1 to fileSystem2-1
> fileSystem1-2 to fileSystem2-2

EventWindow16   516
15th July 2013 – 19th August 2013 (5 weeks)
NASArray1 (fileSystem1-3, fileSystem 1-4)
NASArray2 (fileSystem2-3, fileSystem 2-4)

> MigrationGroup16-1   526
> Assets: NASArray1, NASArray2
> fileSystem1-3 to fileSystem2-3
> fileSystem1-4 to fileSystem2-4

EventWindow17   517
5th August 2013 – 2nd September 2013 (4 weeks)
NASArray1 (fileSystem1-5)
NASArray2 (fileSystem2-5)

> MigrationGroup17-1   527
> Assets: NASArray1, NASArray2
> fileSystem1-5 to fileSystem2-5

EventWindow18   518
3rd September 2013 – 7th September 2013 (4 weeks)
NASArray1 (fileSystem1-1, fileSystem1-2, fileSystem1-3, fileSystem1-4, fileSystem1-5)
NASArray2 (fileSystem2-1, fileSystem2-2, fileSystem2-3, fileSystem2-4, fileSystem2-5)

> MigrationGroup18-1   528
> Assets: NASArray1, NASArray2
> fileSystem1-1 to fileSystem2-1
> fileSystem1-2 to fileSystem2-2
> fileSystem1-3 to fileSystem2-3
> fileSystem1-4 to fileSystem2-4
> fileSystem1-5 to fileSystem2-5

*FIG. 6*

| | JULY | | | AUGUST | | | SEPTEMBER | | |
|---|---|---|---|---|---|---|---|---|---|
| 1 Mo | | | 1 Th | | | 1 Su | Event Window17 | |
| 2 Tu | | | 2 Fr | | | 2 Mo | | |
| 3 We | | | 3 Sa | | | 3 Tu | | |
| 4 Th | Event Window14 | | 4 Su | | | 4 We | | |
| 5 Fr | | | 5 Mo | | | 5 Th | | |
| 6 Sa | | | 6 Tu | | | 6 Fr | | Event Window18 |
| 7 Su | | | 7 We | | | 7 Sa | | |
| 8 Mo | | | 8 Th | | | 8 Su | | |
| 9 Tu | | | 9 Fr | | | 9 Mo | | |
| 10 We | | | 10 Sa | | | 10 Tu | | |
| 11 Th | | | 11 Su | | | 11 We | | |
| 12 Fr | | | 12 Mo | | | 12 Th | | |
| 13 Sa | | | 13 Tu | | | 13 Fr | | |
| 14 Su | | | 14 We | | | 14 Sa | | |
| 15 Mo | | | 15 Th | | | 15 Su | | |
| 16 Tu | | | 16 Fr | | | 16 Mo | | |
| 17 We | | | 17 Sa | | | 17 Tu | | |
| 18 Th | | | 18 Su | Event Window16 | | 18 We | | |
| 19 Fr | | | 19 Mo | | | 19 Th | | |
| 20 Sa | | | 20 Tu | | | 20 Fr | | |
| 21 Su | | | 21 We | | | 21 Sa | | |
| 22 Mo | | | 22 Th | | | 22 Su | | |
| 23 Tu | | | 23 Fr | | | 23 Mo | | |
| 24 We | | | 24 Sa | | | 24 Tu | | |
| 25 Th | | | 25 Su | | | 25 We | | |
| 26 Fr | Event Window15 | | 26 Mo | | | 26 Th | | |
| 27 Sa | | | 27 Tu | | | 27 Fr | | |
| 28 Su | | | 28 We | | | 28 Sa | | |
| 29 Mo | | | 29 Th | | | 29 Su | | |
| 30 Tu | | Event Window16 | 30 Fr | | Event Window17 | 30 Mo | | |
| 31 We | | | 31 Sa | | | | | |

FIG. 9
901

Project6
Assets: Host1, Host2, Switch1, Switch2, Array1, Array2, Array3

906

EventWindow10-1  910-1
5th July 2013 – 7th July 2013 (3 days)
Host1
Host2
Array2 {device2-50 – device2-59}
Array3 {device3-150 – device3-159}

MigrationGroup10-1-1  930-1
Assets: Host1, Host2, Array2, Array3
(device2-50 – device2-59) to
(device3-150 – device3-150)

EventWindow11-1  911-1
26th July 2013 – 28th July 2013 (3 days)
Host1
Host2
Array1 {device1-25 – device1-75}
Array2 {device2-50 – device2-100}

MigrationGroup11-1-1  931-1
Assets: Host1, Host2, Array1, Array2
(device1-25 – device1-75) to
(device2-50 – device2-100)

EventWindow12-1  912-1
23rd August 2013 – 25th August 2013 (3 days)
Host1
Host2
Array1 {device1-225 – device1-299}
Array3 {device3-201 – device3-275}

MigrationGroup12-1-1  932-1
Assets: Host1, Host2, Array1, Array3
(device1-225 – device1-299) to
(device3-201 – device3-275)

EventWindow10-2  910-2
12th July 2013 – 14th July 2013 (3 days)
Host1
Host2
Array2 {device2-60 – device2-79}
Array3 {device3-160 – device3-179}

MigrationGroup10-2-1  930-2
Assets: Host1, Host2, Array2, Array3
(device2-60 – device2-79) to
(device3-160 – device3-179)

EventWindow11-2  911-2
2nd August 2013 – 4th August 2013 (3 days)
Host1
Host2
Array1 {device1-74 – device1-149}
Array2 {device2-101 – device2-174}

MigrationGroup11-2-1  931-2
Assets: Host1, Host2, Array1, Array2
(device1-74 – device1-149) to
(device2-101 – device2-174)

EventWindow12-2  912-2
30th August 2013 – 1st September 2013 (3 days)
Host1
Host2
Array1 {device1-300 – device1-349}
Array3 {device3-276 – device3-325}

MigrationGroup12-2-1  932-2
Assets: Host1, Host2, Array1, Array3
(device1-300 – device1-349) to
(device3-276 – device3-325)

EventWindow10-3 910-3
19th July 2013 – 21st July 2013 (3 days)
Host1
Host2
Array2 {device2-80 – device2-100}
Array3 {device3-180 – device3-200}

MigrationGroup10-3-1 930-3
Assets: Host1, Host2, Array2, Array3
{device2-80 – device2-100} to
{device3-180 – device3-200}

EventWindow11-3 911-3
9th July 2013 – 11th August 2013 (3 days)
Host1
Host2
Array1 {device1-150 – device1-199}
Array2 {device2-175 – device2-224}

MigrationGroup11-3-1 931-3
Assets: Host1, Host2, Array1, Array2
{device1-150 – device1-199} to
{device2-175 – device2-224}

EventWindow11-4 911-4
16th August 2013 – 18th August 2013 (3 days)
Host1
Host2
Array1 {device1-200 – device1-224}
Array2 {device2-225 – device2-249}

MigrationGroup11-4-1 931-4
Assets: Host1, Host2, Array1, Array2
{device1-200 – device1-224} to
{device2-225 – device2-249}

EventWindow12-3 912-3
6th September 2013 – 8th September 2013 (3 days)
Host1
Host2
Array1 {device1-350 – device1-399}
Array3 {device3-326 – device3-375}

MigrationGroup12-3-1 932-3
Assets: Host1, Host2, Array1, Array3
{device1-350 – device1-399} to
{device3-326 – device3-375}

EventWindow12-4 912-4
13th September 2013 – 15th September 2013 (3 days)
Host1
Host2
Array1 {device1-400 – device1-424}
Array3 {device3-376 – device3-400}

MigrationGroup12-4-1 932-4
Assets: Host1, Host2, Array1, Array3
{device1-400 – device1-424} to
{device3-376 – device3-400}

| JULY | | AUGUST | | SEPTEMBER | |
|---|---|---|---|---|---|
| 1 Mo | | 1 Th | | 1 Sa | |
| 2 Tu | | 2 Fr | | 2 Mo | |
| 3 We | | 3 Sa | Event Window 11-2 | 3 Tu | |
| 4 Th | | 4 Su | | 4 We | |
| 5 Fr | | 5 Mo | | 5 Th | |
| 6 Sa | Event Window 10-1 | 6 Tu | | 6 Fr | |
| 7 Su | | 7 We | | 7 Sa | |
| 8 Mo | | 8 Th | | 8 Su | |
| 9 Tu | | 9 Fr | Event Window 11-3 | 9 Mo | |
| 10 We | Event Window 10-2 | 10 Sa | | 10 Tu | |
| 11 Th | | 11 Su | | 11 We | |
| 12 Fr | Event Window 12-2 | 12 Mo | | 12 Th | |
| 13 Sa | | 13 Tu | | 13 Fr | |
| 14 Su | | 14 We | | 14 Sa | |
| 15 Mo | | 15 Th | | 15 Su | |

Project6
Assets: Host1, Host2, Switch1, Switch2, Array1, Array2, Array3

1312-1

---

EventWindow10-1
5th July 2013 – 7th July 2013 (3 days)
Host1
Host2
Array2 {device2-50 – device2-59}
Array3 {device3-150 – device3-159}

MigrationGroup10-1-1
  Assets: Host1, Host2, Array2, Array3
  {device2-50 – device2-59} to
  {device3-150 – device3-159}

EventWindow10-2
12th July 2013 – 14th July 2013 (3 days)
Host1
Host2
Array2 {device2-60 – device2-79}
Array3 {device3-160 – device3-179}

MigrationGroup10-2-1
  Assets: Host1, Host2, Array2, Array3
  {device2-60 – device2-79} to
  {device3-160 – device3-179}

---

EventWindow11-1
26th July 2013 – 28th July 2013 (3 days)
Host1
Host2
Array1 {device1-25 – device1-75}
Array2 {device2-50 – device2-100}

MigrationGroup11-1-1
  Assets: Host1, Host2, Array1, Array2
  {device1-25 – device1-75} to
  {device2-50 – device2-100}

EventWindow11-2
2nd August 2013 – 4th August 2013 (3 days)
Host1
Host2
Array1 {device1-74 – device1-149}
Array2 {device2-101 – device2-174}

MigrationGroup11-2-1
  Assets: Host1, Host2, Array1, Array2
  {device1-74 – device1-149} to
  {device2-101 – device2-174}

---

EventWindow12-1
5th July 2013 – 7th July 2013 (3 days)
Host1
Host2
Array1 {device1-225 – device1-299}
Array3 {device3-201 – device3-275}

MigrationGroup12-1-1   1332-1-1
  Assets: Host1, Host2, Array1, Array3
  {device1-225 – device1-249} to
  {device3-201 – device3-225}

MigrationGroup12-1-2   1332-1-2
  Assets: Host1, Host2, Array1, Array3
  {device1-250 – device1-299} to
  {device3-226 – device3-275}

EventWindow12-2
12th July 2013 – 14th July 2013 (3 days)
Host1
Host2
Array1 {device1-300 – device1-349}
Array3 {device3-276 – device3-325}

MigrationGroup12-2-1
  Assets: Host1, Host2, Array1, Array3
  {device1-300 – device1-349} to
  {device3-276 – device3-325}

EventWindow12-1
5th July 2013 - 7th July 2013 (3 days)
Host1
Host2
Array1 (device1-225 - device1-299)
Array3 (device3-201 - device3-275)

MigrationGroup12-1-1
Assets: Host1, Host2, Array1, Array3
(device1-225 - device1-249) to
(device3-201 - device3-224)
— 1432-1-1

~~MigrationGroup12-1-2
Assets: Host1, Host2, Array1, Array3
(device1-250 - device1-299) to
(device3-225 - device3-275)~~

1412-4

EventWindow12-4
26th July 2013 - 28th July 2013 (3 days)
Host1
Host2
Array1 (device1-250 - device1-299, device1-400 - device1-424)
Array3 (device3-225 - device3-275, device3-376 - device3-400)

MigrationGroup12-4-1
Assets: Host1, Host2, Array1, Array3
(device1-400 - device1-424) to
(device3-376 - device3-400)
— 1432-4

MigrationGroup12-1-2
Assets: Host1, Host2, Array1, Array3
(device1-250 - device1-299) to
(device3-225 - device3-275)
— 1432-1-2

FIG. 15

```
Project6
Assets: Host1, Host2, Switch1, Switch2, Array1, Array2, Array3
┌─────────────────────────────────────┬─────────────────────────────────────┐
│ EventWindow10-1                     │ EventWindow11-1                     │
│ 5th July 2013 - 7th July 2013 (3 days) │ 26th July 2013 - 28th July 2013 (3 days) │
│ Host1                               │ Host1                               │
│ Host2                               │ Host2                               │
│ Array2 {device2-50 - device2-59}    │ Array1 {device1-25 - device1-75}    │
│ Array3 {device3-150 - device3-159}  │ Array2 {device2-50 - device2-100}   │
│ ┌─────────────────────────────────┐ │ ┌─────────────────────────────────┐ │
│ │ MigrationGroup10-1-1            │ │ │ MigrationGroup11-1-1            │ │
│ │ Assets: Host1, Host2, Array2, Array3 │ │ │ Assets: Host1, Host2, Array1, Array2 │ │
│ │ {device2-50 - device2-59} to    │ │ │ {device1-25 - device1-75} to    │ │
│ │ {device3-150 - device3-159}     │ │ │ {device2-50 - device2-100}      │ │
│ └─────────────────────────────────┘ │ └─────────────────────────────────┘ │
├─────────────────────────────────────┼─────────────────────────────────────┤
│ EventWindow10-2                     │ EventWindow11-2                     │
│ 12th July 2013 - 14th July 2013 (3 days) │ 2nd August 2013 - 4th August 2013 (3 days) │
│ Host1                               │ Host1                               │
│ Host2                               │ Host2                               │
│ Array2 {device2-60 - device2-79}    │ Array1 {device1-74 - device1-149}   │
│ Array3 {device3-160 - device3-179}  │ Array2 {device2-101 - device2-174}  │
│ ┌─────────────────────────────────┐ │ ┌─────────────────────────────────┐ │
│ │ MigrationGroup10-2-1            │ │ │ MigrationGroup11-2-1            │ │
│ │ Assets: Host1, Host2, Array2, Array3 │ │ │ Assets: Host1, Host2, Array1, Array2 │ │
│ │ {device2-60 - device2-79} to    │ │ │ {device1-74 - device1-149} to   │ │
│ │ {device3-160 - device3-179}     │ │ │ {device2-101 - device2-174}     │ │
│ └─────────────────────────────────┘ │ └─────────────────────────────────┘ │
├─────────────────────────────────────┼─────────────────────────────────────┤
│                                     │ EventWindow12-1                     │
│                                     │ 5th July 2013 - 7th July 2013 (3 days) │
│                                     │ Host1                               │
│                                     │ Host2                               │
│                                     │ Array1 {device1-225 - device1-249}  │
│                                     │ Array3 {device3-201 - device3-225}  │
│                                     │ ┌─────────────────────────────────┐ │
│                                     │ │ MigrationGroup12-1-1            │ │
│                                     │ │ Assets: Host1, Host2, Array1, Array3 │ │
│                                     │ │ {device1-225 - device1-249} to  │ │
│                                     │ │ {device3-201 - device3-225}     │ │
│                                     │ └─────────────────────────────────┘ │
│                                     ├─────────────────────────────────────┤
│                                     │ EventWindow12-2                     │
│                                     │ 12th July 2013 - 14th July 2013 (3 days) │
│                                     │ Host1                               │
│                                     │ Host2                               │
│                                     │ Array1 {device1-300 - device1-349}  │
│                                     │ Array3 {device3-276 - device3-325}  │
│                                     │ ┌─────────────────────────────────┐ │
│                                     │ │ MigrationGroup12-2-1            │ │
│                                     │ │ Assets: Host1, Host2, Array1, Array3 │ │
│                                     │ │ {device1-300 - device1-349} to  │ │
│                                     │ │ {device3-276 - device3-325}     │ │
│                                     │ └─────────────────────────────────┘ │
└─────────────────────────────────────┴─────────────────────────────────────┘
```

EventWindow10-3
19th July 2013 – 21st July 2013 (3 days)
Host1
Host2
Array2 {device2-80 – device2-100}
Array3 {device3-180 – device3-200}

MigrationGroup10-3-1
Assets: Host1, Host2, Array2, Array3
{device2-80 – device2-100} to
{device3-180 – device3-200}

EventWindow11-3
9th August 2013 – 11th August 2013 (3 days)
Host1
Host2
Array1 {device1-150 – device1-199}
Array2 {device2-175 – device2-224}

MigrationGroup11-3-1
Assets: Host1, Host2, Array1, Array2
{device1-150 – device1-199} to
{device2-175 – device2-224}

EventWindow11-4
16th August 2013 – 18th August 2013 (3 days)
Host1
Host2
Array1 {device1-200 – device1-224}
Array2 {device2-225 – device2-249}

MigrationGroup11-4-1
Assets: Host1, Host2, Array1, Array2
{device1-200 – device1-224} to
{device2-225 – device2-249}

EventWindow12-3
19th July 2013 – 21st July 2013 (3 days)
Host1
Host2
Array1 {device1-350 – device1-399}
Array3 {device3-326 – device3-375}

MigrationGroup12-3-1
Assets: Host1, Host2, Array1, Array3
{device1-350 – device1-399} to
{device3-326 – device3-375}

EventWindow12-4  1512-4
26th July 2013 – 28th July 2013 (3 days)
Host1
Host2
Array1 {device1-250 – device1-299, device1-400 – device1-424}
Array3 {device3-226 – device3-275, device3-376 – device3-400}

MigrationGroup12-4-1  1532-4
Assets: Host1, Host2, Array1, Array3
{device1-400 – device1-424} to
{device3-376 – device3-400}

MigrationGroup12-1-2  1532-1-2
Assets: Host1, Host2, Array1, Array3
{device1-250 – device1-299} to
{device3-226 – device3-275}

*FIG. 15 cont.*

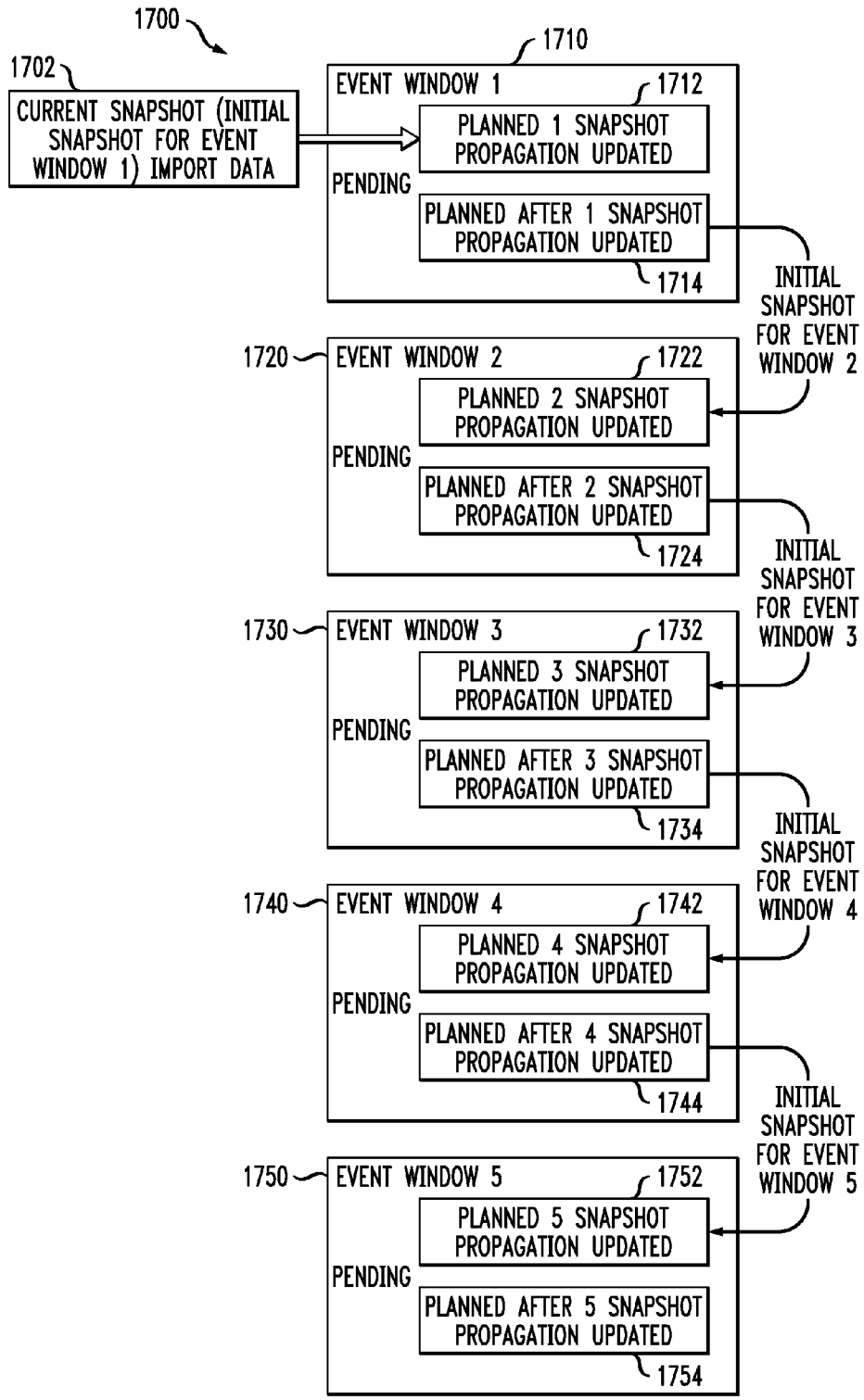

WORKFLOW FOR MIGRATION PLANNING OF DATA STORAGE SYSTEMS

FIELD

The field relates generally to data storage systems, and more particularly to techniques for the development of workflows for migration planning for data storage systems.

BACKGROUND

Migration planning and operations for a data storage system involve coordination of activities that may take weeks or months to complete and use large amounts of computing resources. Event windows used in migration planning include a collection of migration events in a particular time frame and using particular asset configuration. An event window can contain multiple point in time snapshots. A "snapshot" is a representation of a state of a system at a particular point in time.

The use of event windows and snapshots in migration planning operations facilitates the planning of a data storage system as the system goes through different states during a set of configuration changes. It is to be understood that a data storage system may be part of a datacenter. Event windows and snapshots allow an administrator of the datacenter to update the configuration of the data storage system at multiple points in time. The ability to simulate a change to a representation of the datacenter (or data storage center) is referred to as modeling, while actually implementing a change to the datacenter is referred to as migration. For example, an administrator can model what a datacenter would look like given a proposed change to certain resources of a data storage system, while the actual implementation of the resource change would be considered a migration.

When planning a migration, known processes for making configuration changes typically require a user to wait until a new element is delivered before starting a configuration, resulting in increased time on site completing required configuration changes, an increased number of unplanned configuration changes, and a higher risk of unexpected configuration changes.

Event windows provide mechanisms to plan the processes for the configuration changes. However, there is a need for improvement of the event windows to be applicable to multiple types of migration and to enable more expansive changes in workflows for migration planning that can be conducted offsite before an element is delivered, so as to reduce the number of unexpected configuration changes, resulting in improved planning, and a reduction in the time on site completing the required configuration changes.

SUMMARY

Embodiments of the invention provide techniques for improved workflow for migration planning of data storage systems.

For example, in one embodiment, a method comprises the following steps. A plurality of elements representing events of a workflow are generated, wherein each element is active for a predetermined duration. A group of one or more assets to be migrated as a unit are assigned to each element. A group of the one or more assets is moved from a first element of the plurality of elements to a second element of the plurality of elements.

In another embodiment, a computer program product is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, the embodiments of the present invention provide that all assets (e.g., migration group) are managed as a unit. In accordance with embodiments of the present invention, assets can be moved between event windows, and tasks can be moved between migration groups that are in the same event window and also in different event windows. By using event windows and migration groups it is possible facilitate workflow planning for running migrations in parallel, modifying an order of migrations, and re-using assets that become available when a migration is complete in a particular event window, e.g., if a user migrates data from a device in one event window, this device is available to use in subsequent event windows.

These and other features and advantages of the present invention will become more readily apparent from the accompanying drawings and the following detailed description.

BRIEF DESCRIPTION OF THE DRAWINGS

FIG. 5 illustrates a configuration of event windows in accordance with an embodiment of the present invention.

FIG. 6 illustrates a calendar view of event windows from FIG. 5.

FIG. 9 illustrates a configuration of event windows in connection with a more detailed view of a migration to be performed in accordance with an embodiment of the present invention.

FIG. 10 illustrates a calendar view of the more detailed view from FIG. 9.

FIG. 11 illustrates a calendar of the running in parallel of event windows in accordance with an embodiment of the present invention.

FIG. 14 illustrates a change to eliminate a migration group from an event window and adding the migration group to another event window in accordance with an embodiment of the present invention.

FIG. 15 illustrates event windows in connection with the more detailed view from FIG. 12, including updated event windows in accordance with an embodiment of the present invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1:
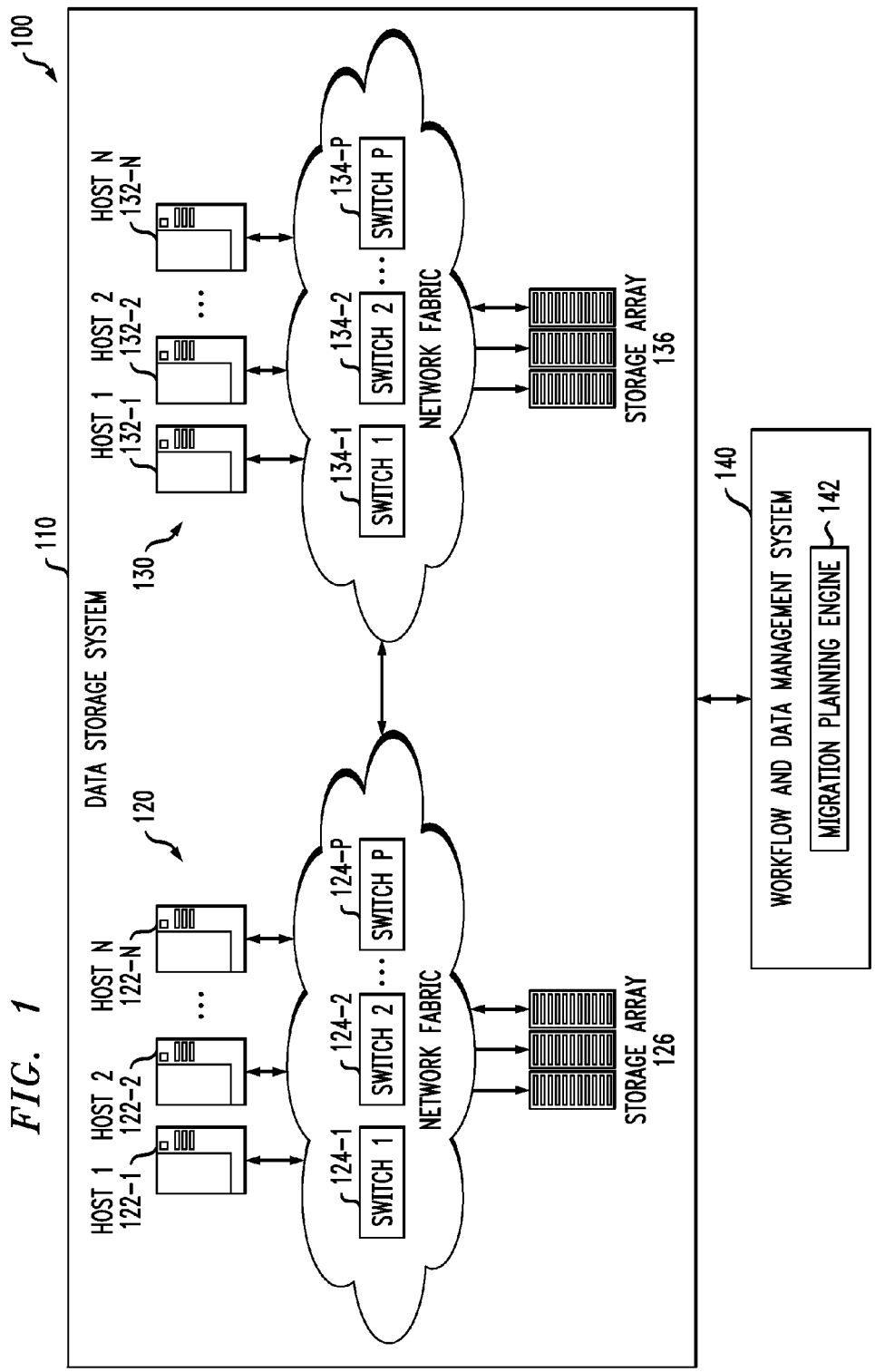
FIG. 1 shows a data storage environment with a workflow and data management system according to an embodiment of the invention.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (LUNs). Thus, each subsystem can have both logical execution components and physical execution components. Also, it is to be understood that each storage array may have one or more physical storage devices associated therewith.

Also shown in system environment 100 is a workflow and data management system 140. The management system 140 is a computer-based tool used by administrators of the data storage system 110 to plan a workflow which utilizes generic groupings that can be used regardless of the type of migration, and automates the acquisition, distribution and migration of data within the data storage system. Data can be, for example, acquired, distributed, and/or migrated from storage array 126 in subsystem 120 to storage array 136 in subsystem 130, or vice versa. Also, data may need to be acquired, distributed and/or migrated from one storage array to another storage array within the same subsystem. Reasons for the data acquisition, distribution and/or migration are application-dependent, but could be driven by data and resource management decisions made by the infrastructure provider.

The management system 140 includes migration planning engine 142, which controls, by using generic groupings (as described further below), the acquisition, distribution and/or migration of data in the data storage system 110 for multiple types of migration.

Advantageously, embodiments of the present invention provide a workflow for migration planning utilizing generic groupings that can be used regardless of the type of migration. In accordance with embodiments of the present invention, the same groupings can be used, for example, for block level migration, file system level migration, virtual machine migration, etc.

As used herein, components/groupings of a workflow include, but are not limited to, a project, event window, migration group and a snapshot.

As used herein, a project refers to a real-life migration project. Each project contains one or more event windows.

As used herein, an event window (or migration window) refers to a collection of migration events that share the same time window and asset configuration. An event window can contain multiple migration groups and point in time snapshots. Event windows start at a specific date and have a fixed end date. It is possible for event windows to overlap in the same timeline. In the case of overlapping event windows, it may be necessary to manage the assets that are included in the event windows to minimize or prevent overlapping changes on the same assets.

As used herein, a migration group refers to a group of assets and associated configurations that will be/are migrated as a single unit, e.g., hosts and associated array devices. Migration may occur within a particular asset or between assets. There may be some physical configuration required to execute the migration described in this group. In accordance with an embodiment of the present invention, details of the physical configuration required to execute the migration are recorded in one or more asset snapshots, e.g., migration/production state snapshot, rather than in the migration group. There is no hard limit on the number of assets. In accordance with an embodiment of the present invention, the number of assets is relatively small, for example, in the 100s rather than the 1000s.

As used herein, a snapshot refers to a point in time description of the state of all elements, for example, a point in time representation of a data storage system. A snapshot may include a set of planned configuration changes. In accordance with embodiments of the present invention, examples of snapshots are migration state, production state and current state snapshots. Snapshots can contain a complete copy of information in connection with an environment or just sufficient information to represent the environment at different points in time. Like event windows, it is possible for snapshots to overlap in the same timeline. In the case of overlapping snapshots, it may be necessary to manage the assets that are included in the snapshots to minimize or prevent overlapping changes on the same assets.

As used herein, a migration state snapshot refers to a snapshot that stores a configuration(s) that is required for completing migration, e.g., masking/mapping. In accordance with embodiments of the present invention, no data is imported directly into this snapshot, and modeling can be performed in this snapshot.

As used herein, a production state snapshot refers to a snapshot that facilitates configuration changes that are required after a migration to get a storage environment to its desired end state. In accordance with embodiments of the present invention, no data is imported directly into this snapshot, and modeling can be performed in this snapshot.

As used herein, a current state snapshot refers to a present state of the data storage system. Information is updated in a current snapshot by importing/re-importing data and/or assets. Data collected from a storage environment is imported into the current snapshot using a data source, e.g., SYMAPI. In accordance with embodiments of the present invention, modeling is not performed in this snapshot.

Embodiments of the present invention provide that all assets (e.g., migration group) within each grouping are managed as a unit. In accordance with embodiments of the present invention, the following occurs: (1) rules are run against a grouping to generate information, warning and error messages; (2) scripts are generated that can be executed on the assets in the grouping. These scripts can be used for migration or creating new configurations on the assets; (3) run book instructions for the grouping are generated; (4) project management (PM) reports for the grouping are generated; (5) configuration guides for the grouping are generated; and/or (6) spreadsheet (e.g., Excel®) reports for the groupings are generated. It is to be understood that the embodiments of the present invention are not limited to the foregoing occurrences.

Figure 16:
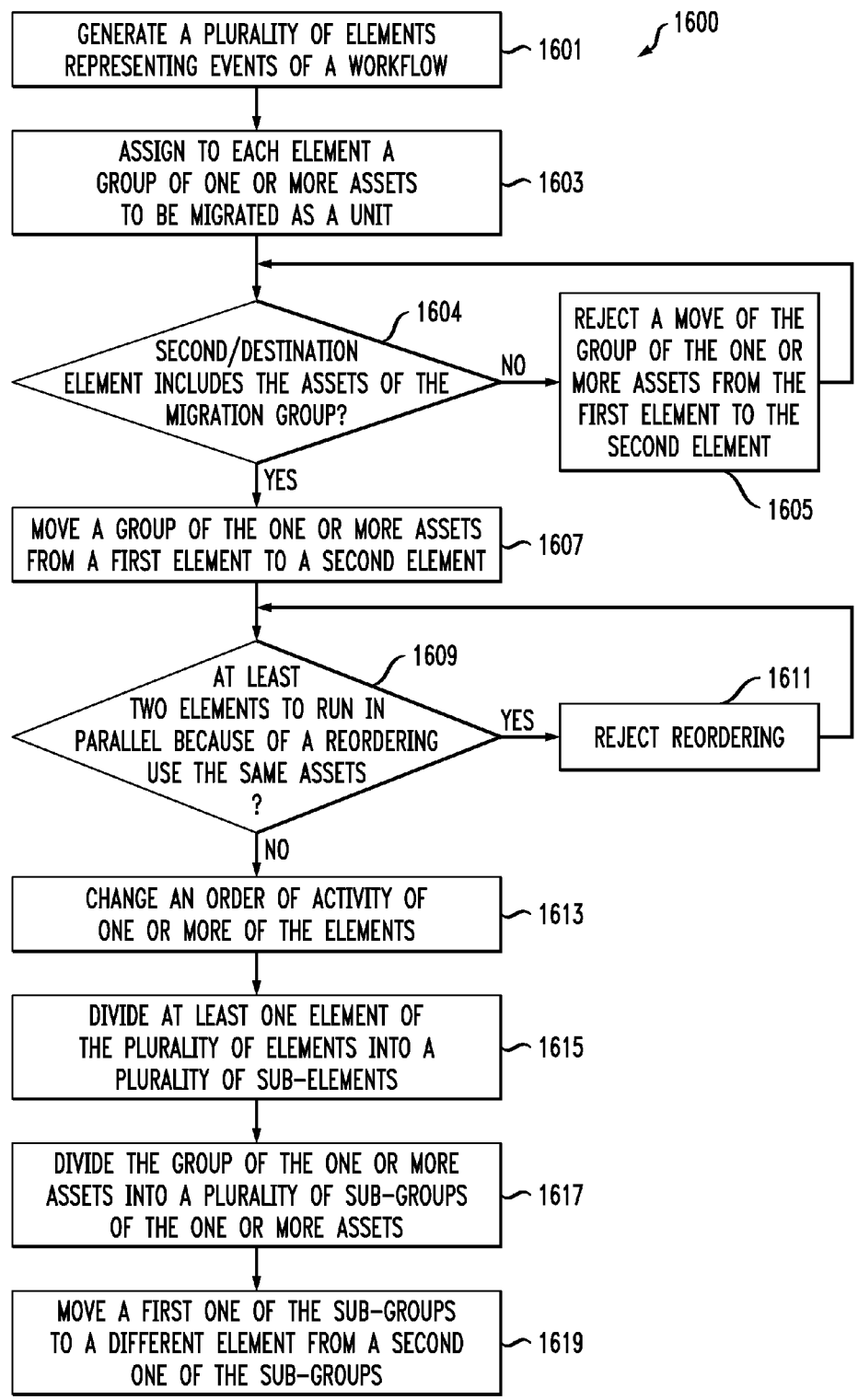
FIG. 16 is a flow chart showing a method for the development of a workflow for migration planning, in accordance with an embodiment of the present invention.

During the timeline of a project it may be often necessary to re-import assets multiple times to reflect the changes that have occurred in an environment. Changes in an environment are merged with changes that are modeled as part of migration planning. As a non-limiting example, importing and re-importing are described herein below in connection with FIG. 16. FIG. 16 gives examples of non-overlapping snapshots. However, the methodology is the same or essentially the same for overlapping snapshots.

In accordance with embodiments of the present invention, assets can be moved between event windows, and tasks can be moved between migration groups that are in the same event window and also in different event windows. By using event windows it is possible to re-use assets that become available when a migration is complete in a particular event window, e.g., if a user migrates data from a device in one event window, this device is available to use in subsequent event windows.

It is to be understood that the embodiments of the present invention are not necessarily limited to the groupings described herein, and that other groupings may also be included in a workflow to handle other scenarios. In addition, although embodiments of the present invention are described herein in the context migration planning, the embodiments are not necessarily limited thereto, and may be used in other scenarios.

Figure 2:
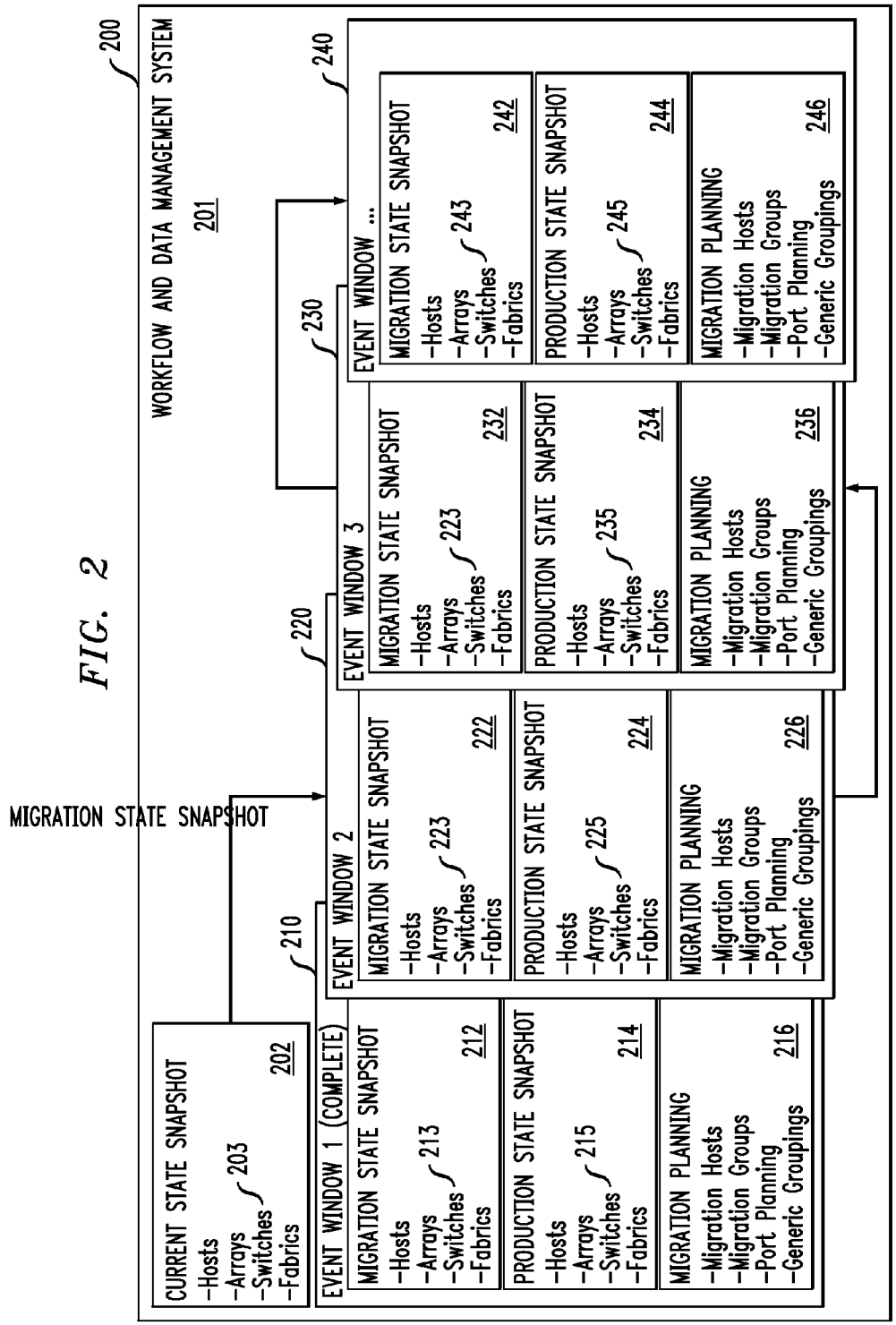
FIG. 2 shows a workflow and data management system according to an embodiment of the invention.

FIG. 2 shows a workflow and data management system 200 according to an embodiment of the invention. The system 200 includes a project 201 including a current state snapshot 202 and a plurality of event windows 210, 220, 230 and 240. It is to be understood that the number of event windows is for purposes of illustration, and that there may be more or less event windows. As can be seen, each event window includes a migration state snapshot 212, 222, 232, 242 and a production state snapshot 214, 224, 234, 244. The snapshots 202, 212-242 and 214-244 include migration groups 203, 213-243 and 215-245 including, for example, host, array, switch and fabric information. In accordance with an embodiment of the present invention, an event window at least groups a migration state snapshot and a production state snapshot together. The event window represents a defined set of configuration changes to the storage environment (e.g., if a migration occurs on a particular weekend, the event window represents that weekend). As seen in FIG. 2, the event windows 210, 220, 230, 240 further include migration planning data 216, 226, 236 and 246, including, for example, generic groupings, migration hosts, groups and port planning.

Referring to FIG. 2, event window 1 210 represents a closed/complete event window, i.e., a window that is not being changed. The remaining windows 220, 230 and 240 are pending, i.e., still subject to modification. As can be seen in FIG. 2, the current state snapshot 202 is the initial snapshot for the first pending event window (in this case, event window 2 220). If, for example, event windows 1 and 2 210, 220 were closed, the current state snapshot would be the initial snapshot for event window 3 230. This continues until all event windows are closed. According to an embodiment, when the last event window is closed, the current state snapshot may be imported into the event windows, but none of the event windows will be updated as a result of the importation.

As illustrated by the arrows, the initial snapshot for event window 3 230 comes from event window 2 220 and the initial snapshot for event window 4 240 comes from event window 3 230. For example, according to an embodiment of the present invention, the production state snapshot 224 is the initial snapshot for event window 230 and the production state snapshot 234 is the initial snapshot for event window 240.

In accordance with embodiments of the present invention, due to the connection between windows, a user can plan multiple event windows at the same time. For example, according to an embodiment of the present invention, modeling that is completed in one event window (e.g., event window 2 220) will also be visible in subsequent event windows (e.g., event windows 230, 240). For example, a masking setup in the production state snapshot of one event window (e.g., window 220) will be visible in the migration state snapshot of the subsequent event window(s) (e.g., windows 230, 240).

The event windows 210-240 form a timeline for each project, from the start of a migration to the end. In accordance with an embodiment of the present invention, each event window 210-240 will have a fixed start time (e.g., a start date) and end time (e.g., end date). The event windows can overlap. This means that the start date of one event window is between the start and end date of another event window. It is possible for a user to modify the start and end date of any event window in a project. Each time a start/end date is changed, the modification can have an impact on other event windows in a project. Sometimes this impact means that assets/subassets that are assumed to be present will not be present. Depending on timing, assets/subassets being used in an event window might be modified or may not be available due to use by other event windows.

Moving migration groups between event windows has an impact similar to moving event windows. Advantageously, by using event windows and migration groups, embodiments of the present invention facilitate changes to a migration plan when required by moving event windows, migration groups or assets.

Given unlimited resources, it could be beneficial to complete all event windows at the same time, but a project is typically limited by the resources that are available to a project. Examples of resources that can be considered when scheduling event windows in parallel include limitations on the hosts/arrays and personnel available to complete the migration. Event windows do, however, provide flexibility to easily re-order the tasks that are being completed.

Referring to examples of the application of embodiments of the present invention described in connection with FIGS. 3-15, the following notes are applied:

Note1: Where it is mentioned that data is moved from fileSystem<number>-<number> to fileSystem<number>-<number>, it is assumed that shares, exports and other configurations associated with the filesystem are also moved.

Note2: It is assumed that assets NASArray1, NASArray2, Array1, Array2, Array3, Host1, Host2, Switch1, Switch2 are imported at least once before they are added to an event window. In accordance with embodiments of the present invention, the assets can be imported multiple times and at any stage during the planning and re-ordering of event windows.

Note3: Where it is mentioned that devices are part of a migration group, it can be assumed that any valid configuration modification that can be made to the device is permitted. It is also assumed that other sub-assets within arrays/switches/hosts may also be configured in the event windows, e.g. masking, mapping, zoning, etc.

Note4: In migration groups the association is typically from one or more assets to one or more assets. In the examples below a 1:1 association is being used.

Note5: When a migration group is moved from one event window to another event window, the migration group will follow the rules of the new event window. For example, if the new event window does not contain one of the assets that was used in the old event window, then a decision has to be made on how this should be handled. In the examples below, it is assumed that the configuration will be lost when the asset cannot be included in the new event window. Alternatively, embodiments of the present invention permit, automatically or on user prompt, adding an asset to the new event window, or preventing the migration group from being moved to an event window until added the asset(s) is first added.

Note6: The examples list the subassets that data is being moved to. In many cases these assets are configured as part of the migration. Where this is the case, a block reservation of the resources required, for example, for devices, a range of device Id and capacity on the array, could be reserved.

Note 7: The term Array as used in the examples can represent any type of array (e.g., Symmetrix® array), and the term filesystem as used in the examples can represent any type of file system (e.g., NetApp® filer).

It is to be understood that embodiments of the present invention are not necessarily limited to the particular approaches in Notes 1-7.

Figure 3:
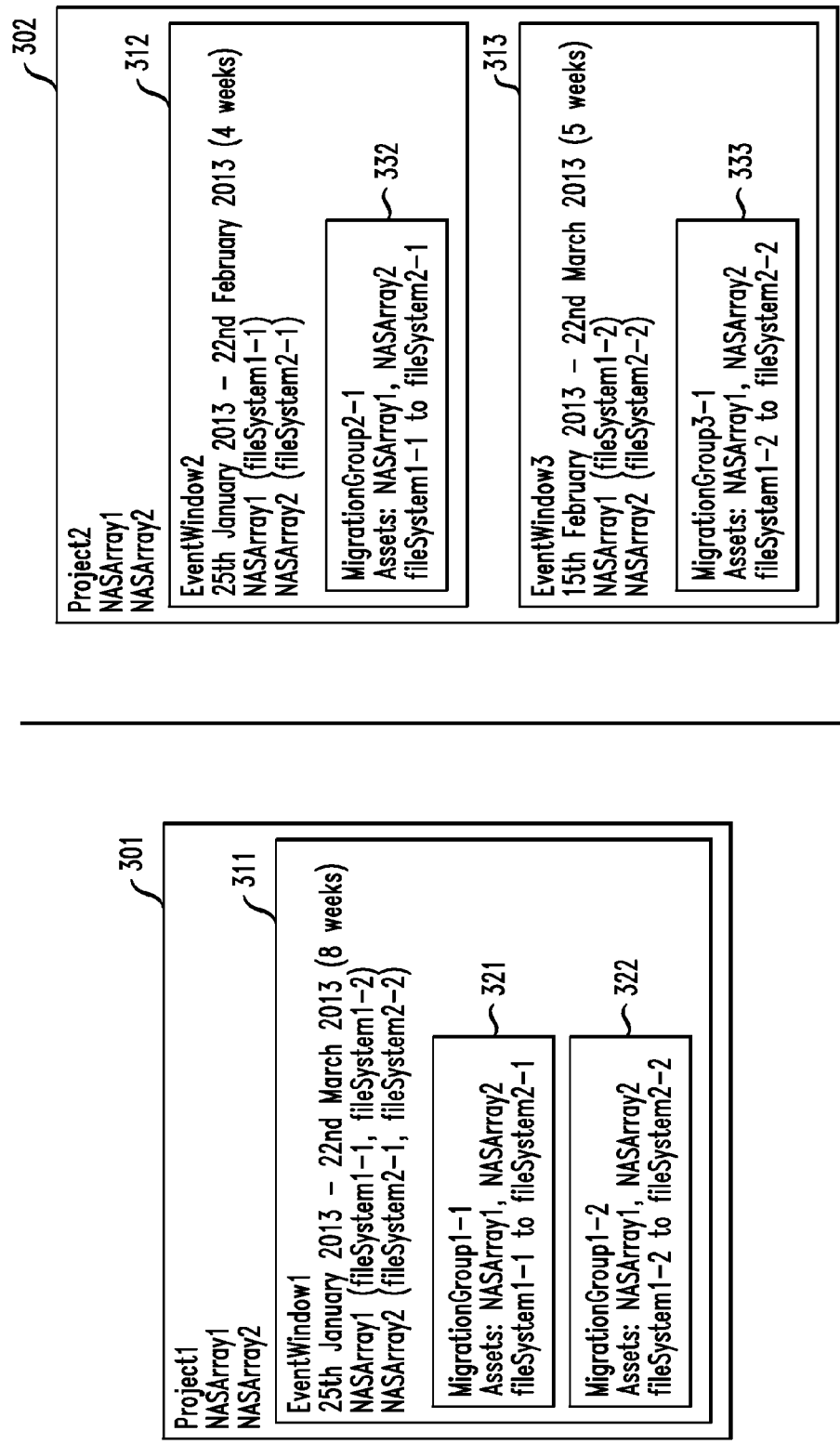
FIG. 3 illustrates a configuration of event windows in accordance with an embodiment of the present invention.

FIG. 3 illustrates a configuration of event windows in accordance with an embodiment of the present invention. Referring to FIG. 3, in Example 1, a user imports network-attached storage arrays (NASArrays) NASArray1 and NASArray2 into Project1 301. The NAS migration is scheduled to take 4 weeks to copy data from fileSystem1-1 to fileSystem2-1 and 5 weeks to copy data from fileSystem1-2 to fileSystem2-2. A user creates EventWindow1 311 and creates MigrationGroup1-1 321 to move data from fileSystem1-1 to fileSystem2-1. MigrationGroup1-2 322 is created to move data from fileSystem1-2 to fileSystem2-2. If the migration from fileSystem1-2 starts 3 weeks after the migration from fileSystem1-1 then the duration of the event window is 8 weeks. By having both migration groups in the same event window (EventWindow1 311) it is not clear in which period each of the filesystems is being migrated. The actual timeframe is lost as both filesystems are represented by the same timeframe. If two separate event windows are used, EventWindow2 312 and EventWindow3 313, then it is possible to see the time frames of 4 weeks to migrate fileSystem1-1 to fileSystem2-1 (25 Jan. 2013-22 Feb. 2013) and 5 weeks to migrate fileSystem1-2 to fileSystem2-2 (15 Feb. 2013-22 Mar. 2013). In FIG. 3, the migration groups 321, 322, 332 and 333 include the same assets.

Figure 4:
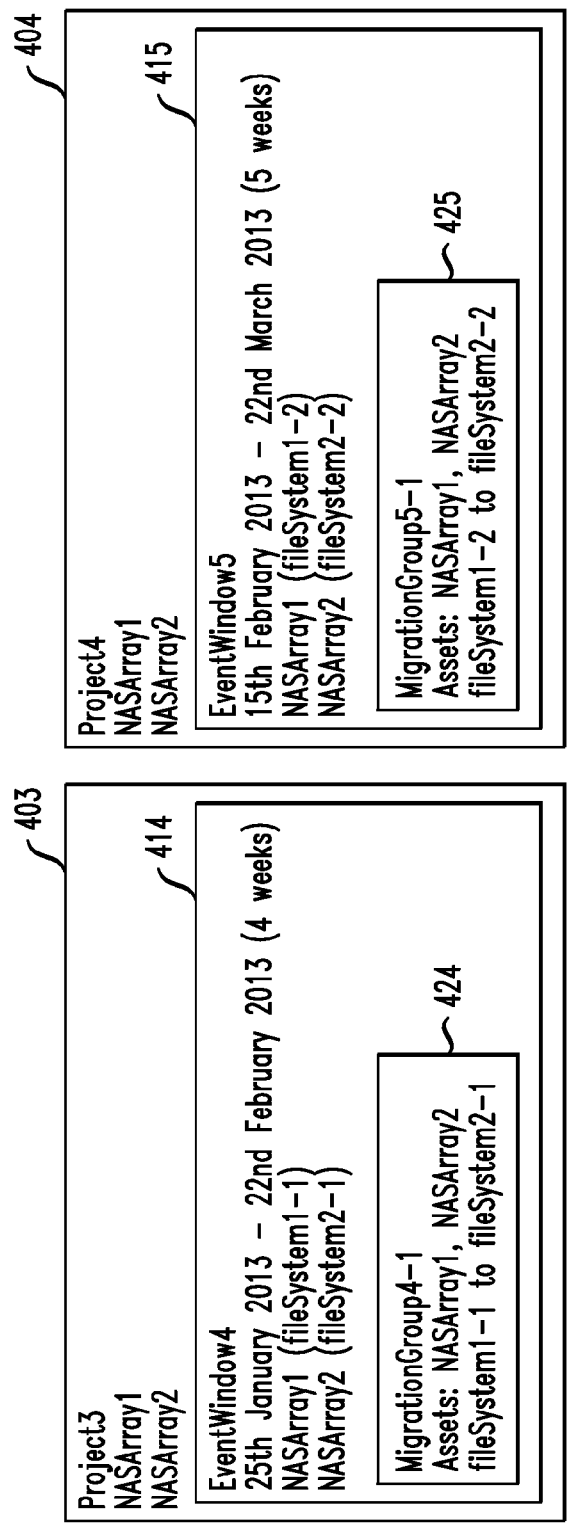
FIG. 4 illustrates a configuration of event windows in accordance with an embodiment of the present invention.
Figure 4:
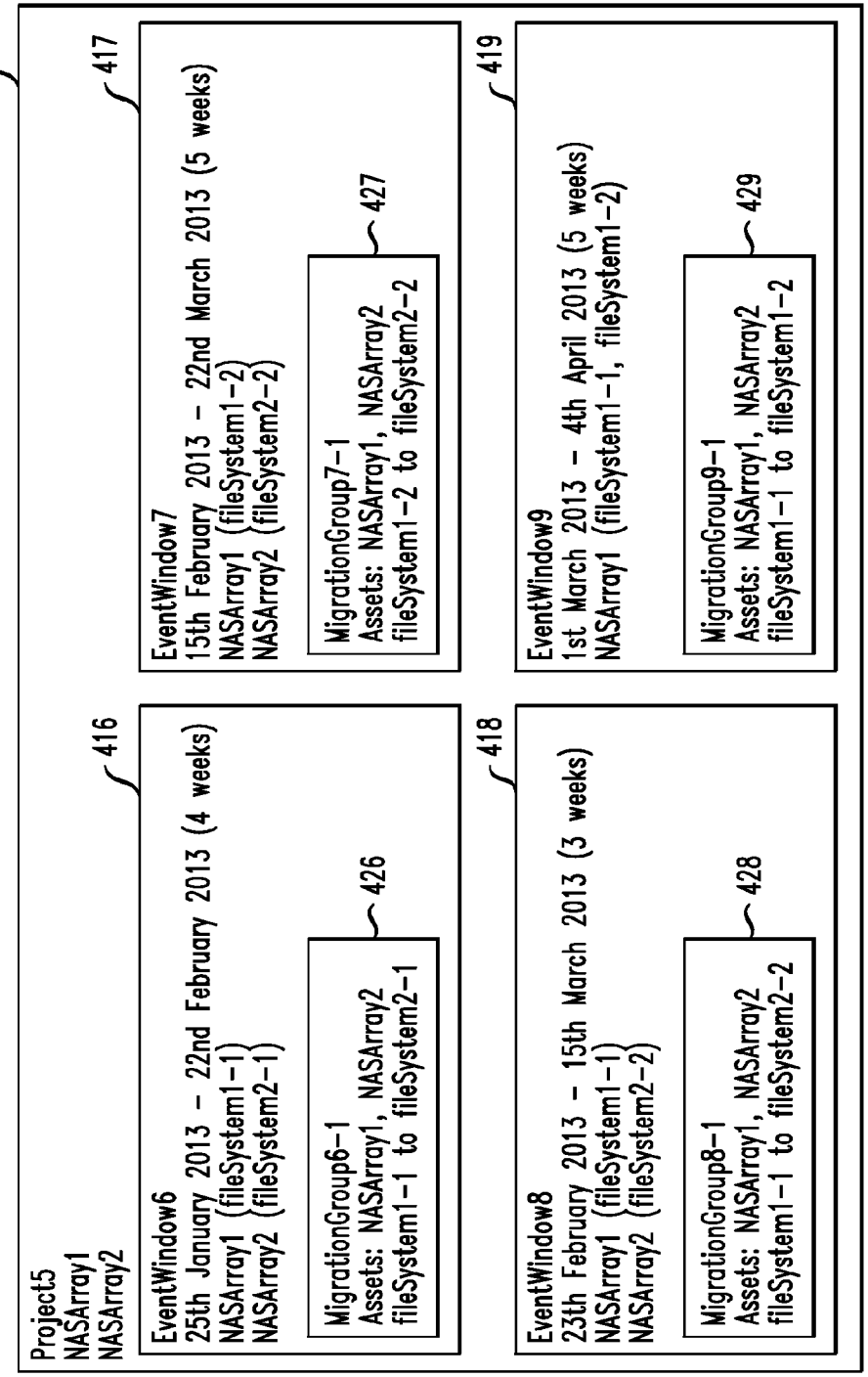

FIG. 4 illustrates a configuration of event windows in accordance with an embodiment of the present invention. Referring to FIG. 4, in Example 2, Project3 403 includes EventWindow4 414 with a duration of 4 weeks. EventWindow4 414 includes migration group 424 and is used to migrate from fileSystem1-1 to fileSystem2-1. Project4 404 includes EventWindow5 415 with a duration of 5 weeks. EventWindow5 415 includes migration group 425 and is used to migrate from fileSystem1-2 to fileSystem2-2.

A user wants to create a subsequent event windows EventWindow8 418 with duration 3 weeks and EventWindow9 419 with duration 5 weeks. EventWindow8 418 includes migration group 428 and is used to migrate from fileSystem1-1 to fileSystem2-2. EventWindow9 419 includes migration group 429 and is used to migrate from fileSystem1-1 to fileSystem1-2.

In order to create EventWindow8 and EventWindow9, it is first determined which project should be used to create EventWindow8 and EventWindow9. As EventWindow4 414 and EventWindow5 415 are in two separate projects 403 and 404, there is no single project which has the most up to date information. In the case of the two separate projects 403 and 404, the user will have to complete manual steps in order to complete migration planning. As a result there are additional overheads and risks of errors using separate projects.

In accordance with an embodiment of the present invention, with overlapping Event Windows, EventWindow8 and EventWindow9 can be completed in one project. Project5 405 includes EventWindow6 416 with a duration of 4 weeks and EventWindow7 417 with a duration of 5 weeks. As a duplicate of EventWindow4 414, EventWindow6 416 includes migration group 426 and is used to migrate from fileSystem1-1 to fileSystem2-1. As a duplicate of EventWindow 5 415, EventWindow7 417 includes migration group 427 and is used to migrate from fileSystem1-2 to fileSystem2-2. As a result, EventWindow8 418 with a duration of 3 weeks and EventWindow9 419 with a duration of 5 weeks can be created in Project5 405 along with EventWindow 6

416 and EventWindow 7 417. EventWindow8 418 includes migration group 428 and is used to migrate from fileSystem1-1 to fileSystem2-2. EventWindow9 419 includes migration group 429 and is used to migrate from fileSystem1-1 to fileSystem1-2. In FIG. 4, the migration groups 424-429 include the same assets. EventWindow9 only contains NASArray1 because is being made from fileSystem1-1 (on NASArray1) to fileSystem1-2 (on NASArray1).

FIG. 5 illustrates a configuration of event windows in accordance with an embodiment of the present invention. Referring to FIG. 5, Example 3 including Project 7 507 is shown. In Example 1 and Example 2, it is assumed that a complete NAS filesystem migration will occur in the same Event Window. Typically this type of migration can span multiple weekends and require incremental copying of data. Due to the duration of the event windows, in accordance with an embodiment of the present invention, the task is split into parts as in Example 3. For example, the first event window in Project 7 507 (EventWindow14 514) could be used to configure the pre-production setup. This is not an overlapping event window. A second set of event windows including EventWindow 15 515, EventWindow16 516 and EventWindow 17 517 are overlapping and are used to manage the incremental copy of data. These operations can take a significant amount of time. The last event window, EventWindow18 518 is a cutover window corresponding to, for example, the overlap from when the new system is live until the old system has been shut down. This event window 518 is not overlapping. As can be seen in FIG. 5, migration groups 525, 526 and 527 include parts of migration groups 524 and 528. For example, all of the migration groups include the same assets, migration group 525 includes the first two filesystem migrations of migration groups 524 and 528, migration group 526 includes the next two filesystem migrations of migration groups 524 and 528, and migration group 527 includes the last filesystem migration of migration groups 524 and 528.

FIG. 6 illustrates a calendar view of EventWindow14 514-EventWindow18 518 from FIG. 5.

Figure 7:
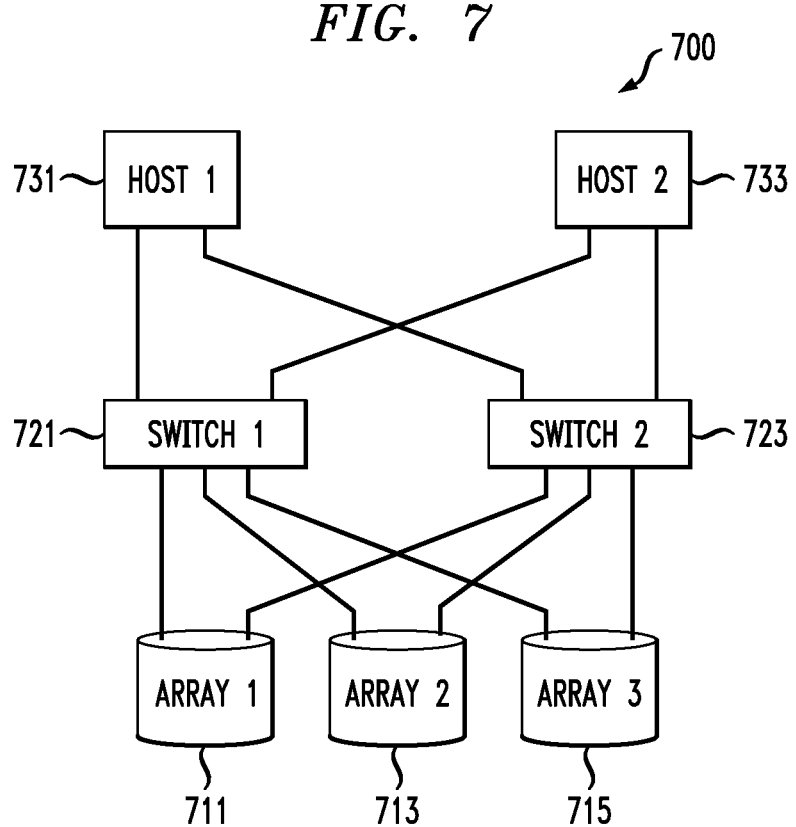
FIG. 7 is a block diagram of a storage area network (SAN) on which a migration plan in accordance with an embodiment of the present invention is executed.

FIG. 7 is a block diagram of a storage area network (SAN) on which a migration plan in accordance with an embodiment of the present invention is executed. Referring to FIG. 7, an SAN 700 includes the following assets which are part of the migration: Host1 731, Host2 733, Switch1 721, Switch2 723, Array1 711, Array2 713 and Array 3 715. An objective of the migration is that Array1 711 will be removed from the SAN 700 and devices on Array1 711 will be moved to Array2 713 and Array3 715. Some devices on Array2 713 will be moved to Array3 715. The new capacity available as a result of moving devices from Array2 will be needed to move some of the devices from Array1 711 to Array2 713.

Figure 8:
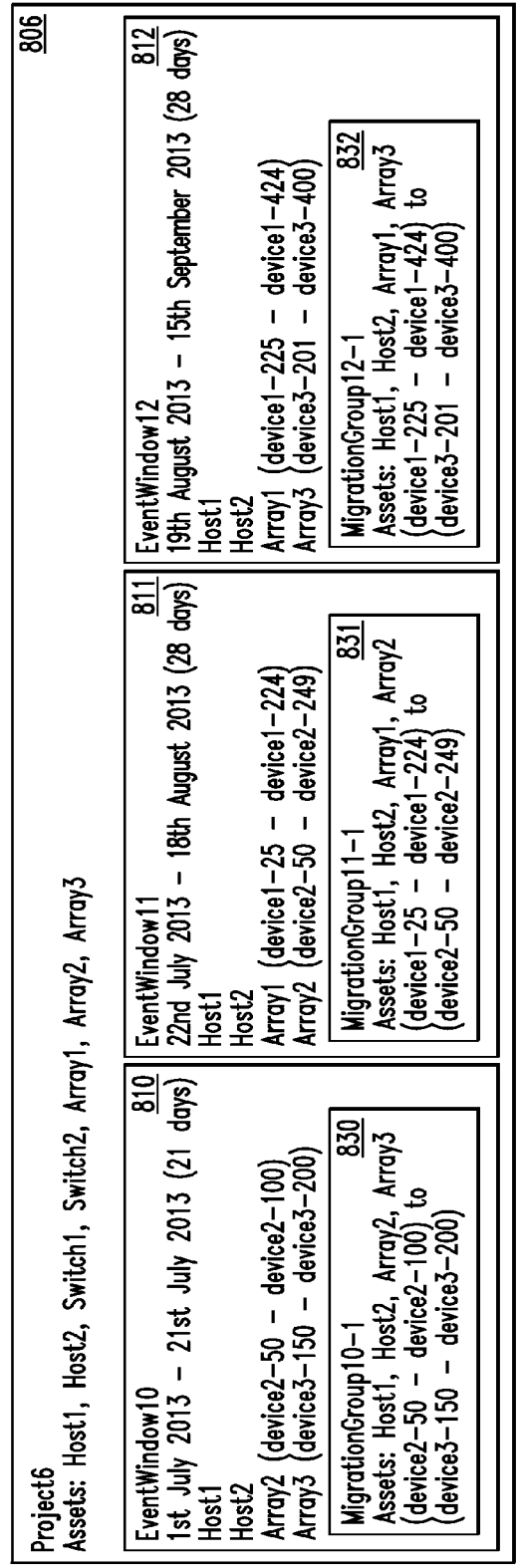
FIG. 8 illustrates a configuration of event windows in connection with an initial proposal of a migration to be performed in accordance with an embodiment of the present invention.

FIG. 8 illustrates a configuration of event windows in connection with an initial proposal of a migration to be performed in accordance with an embodiment of the present invention. Referring to FIG. 8, the initial proposal 801 includes Project6 806 with EventWindow10 810 including migration group 830, EventWindow11 811 including migration group 831 and EventWindow12 812 including migration group 832. According to the hypothetical of Example 4, after reviewing the initial proposal 801 it was decided that the event windows did not give the level of detail required to manage the project accurately. It was also requested that the event windows be completed on weekends to reduce the disruption to users of the storage.

Figure 10:
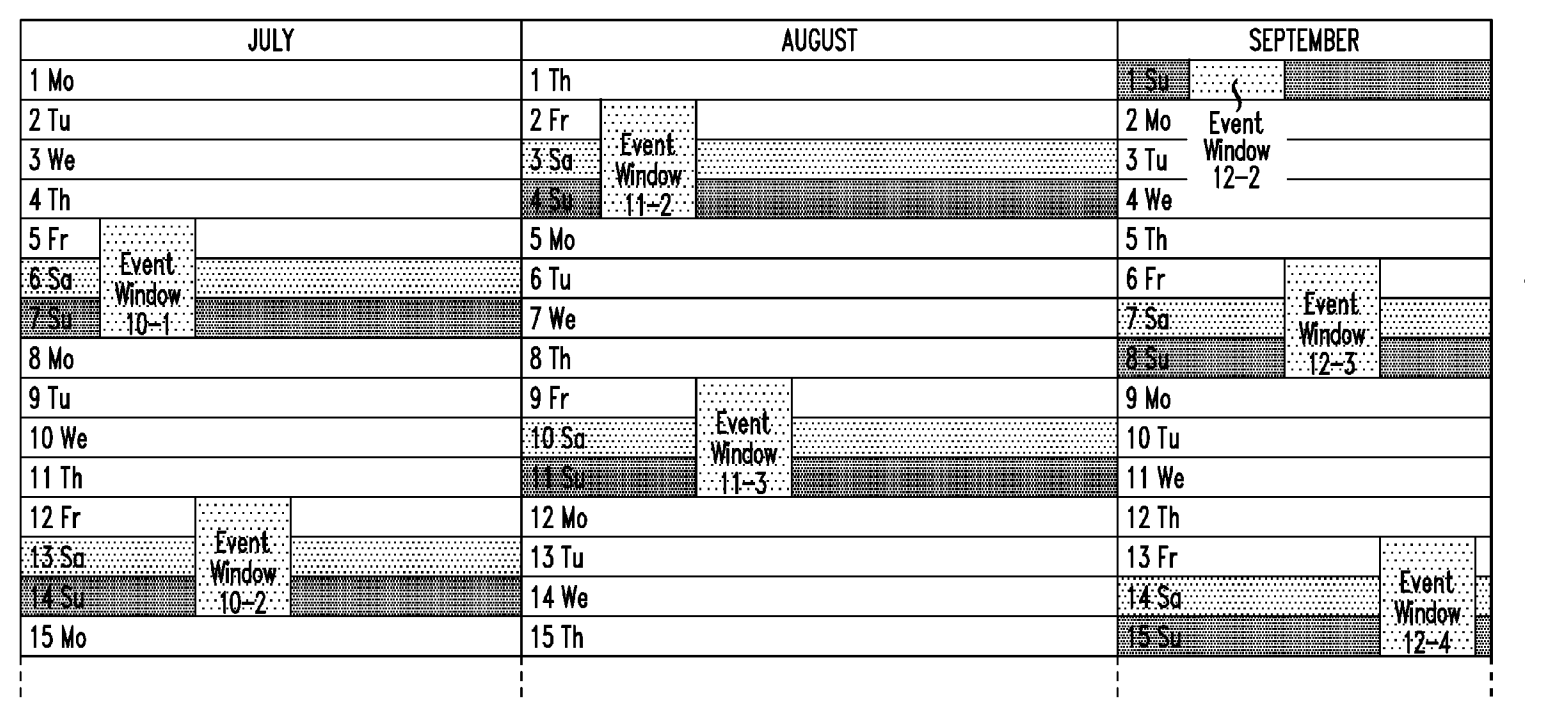
Figure 10:
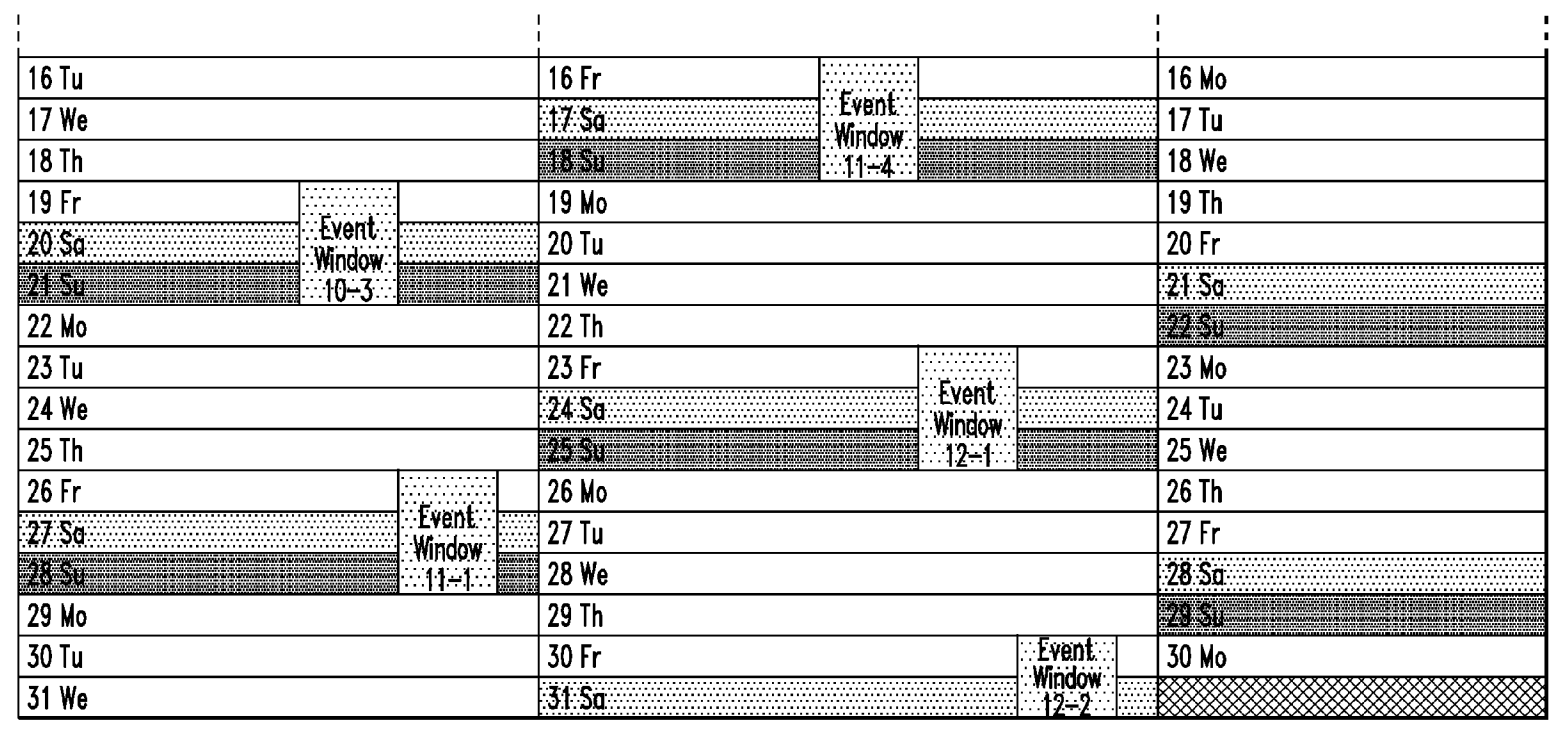

FIG. 9 illustrates a configuration of event windows in connection with a more detailed view of a migration to be performed in accordance with an embodiment of the present invention. Referring to FIG. 9, the more detailed view 901 includes Project6 906 with EventWindow10-1 910-1 including migration group 930-1, EventWindow10-2 910-2 including migration group 930-2, EventWindow10-3 910-3 including migration group 930-3, EventWindow1 1-1 911-1 including migration group 931-1, EventWindow1 1-2 911-2 including migration group 931-2, EventWindow1 1-3 911-3 including migration group 931-3, EventWindow11-4 911-4 including migration group 931-4, EventWindow12-1 912-1 including migration group 932-1 EventWindow12-2 912-2 including migration group 932-2, EventWindow12-3 912-3 including migration group 932-3 and EventWindow12-4 912-4 including migration group 932-4. FIG. 10 illustrates a calendar view of the more detailed view 901 from FIG. 9. As can be seen from FIGS. 9 and 10, the EventWindow10, EventWindow1 1 and EventWindow12 are divided into parts showing detail of the specific tasks over time periods of 3 days in the case of each EventWindow 910-1 to 910-3, 911-1 to 911-4 and 912-1 to 912-4. As can be understood from FIGS. 9 and 10, there is no overlap between the event windows.

Figure 11:
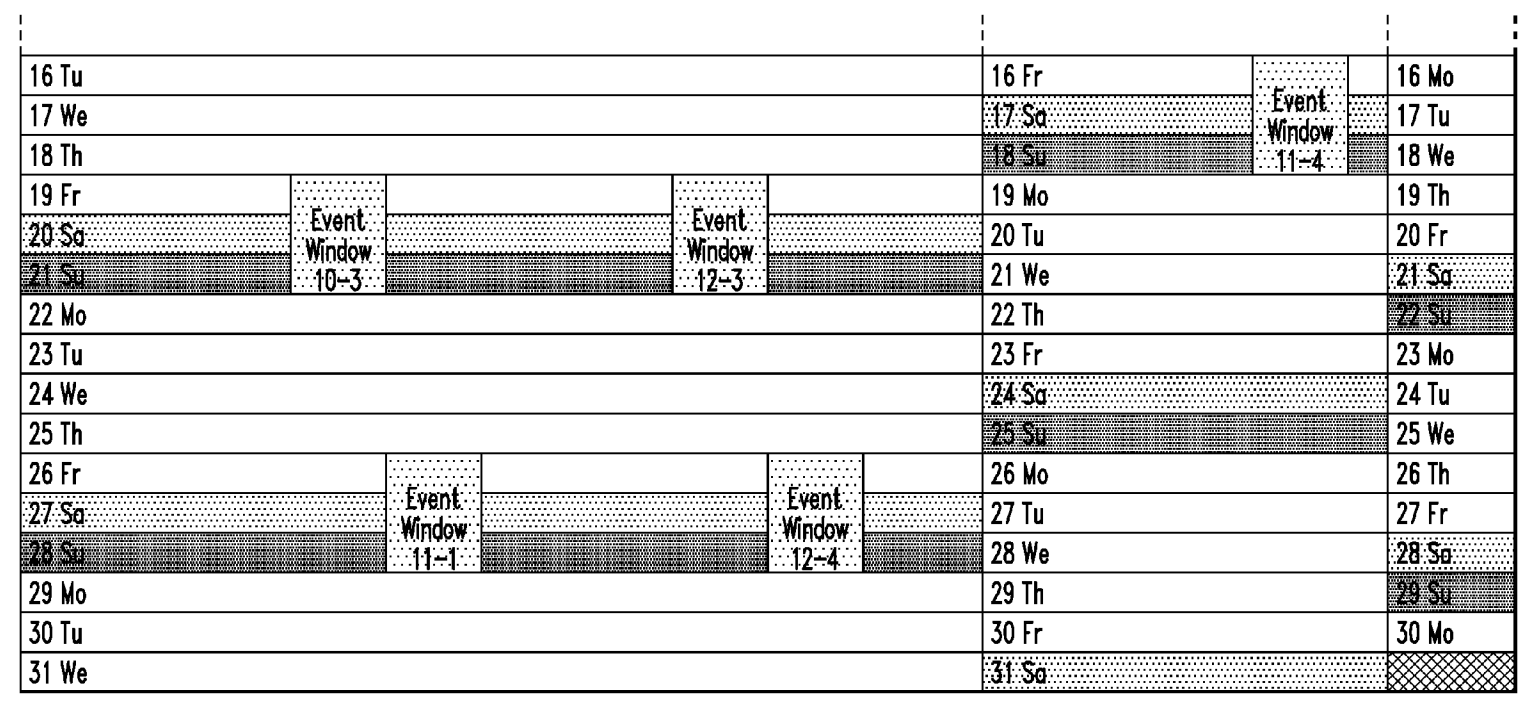

According to the hypothetical of Example 4, after reviewing the more detailed view 901 from FIG. 9, it is decided that the migration could be optimized by completing some of the migration in parallel. This could be done by re-ordering the event windows and completing some of them in parallel. As can be understood from FIG. 9, EventWindow10-X and EventWindow12-X could run in parallel as separate devices are used for each of the EventWindows 910-1 to 910-3 and 912-1 to 912-4. Similarly, EventWindow11-1 can run in parallel with EventWindow12-4 due to a difference of devices. EventWindow11-X cannot run in parallel with EventWindow10-X as some devices that are being migrated from in EventWindow10-X are required for EventWindow11-X (e.g., EventWindow10-1 and EventWindow11-1 both use device2-50-device2-59). A calendar of the running in parallel of EventWindows10-1 and 12-1, 10-2 and 12-2, 10-3 and 12-3 and 11-1 and 12-4 is shown in FIG. 11

Figure 12:
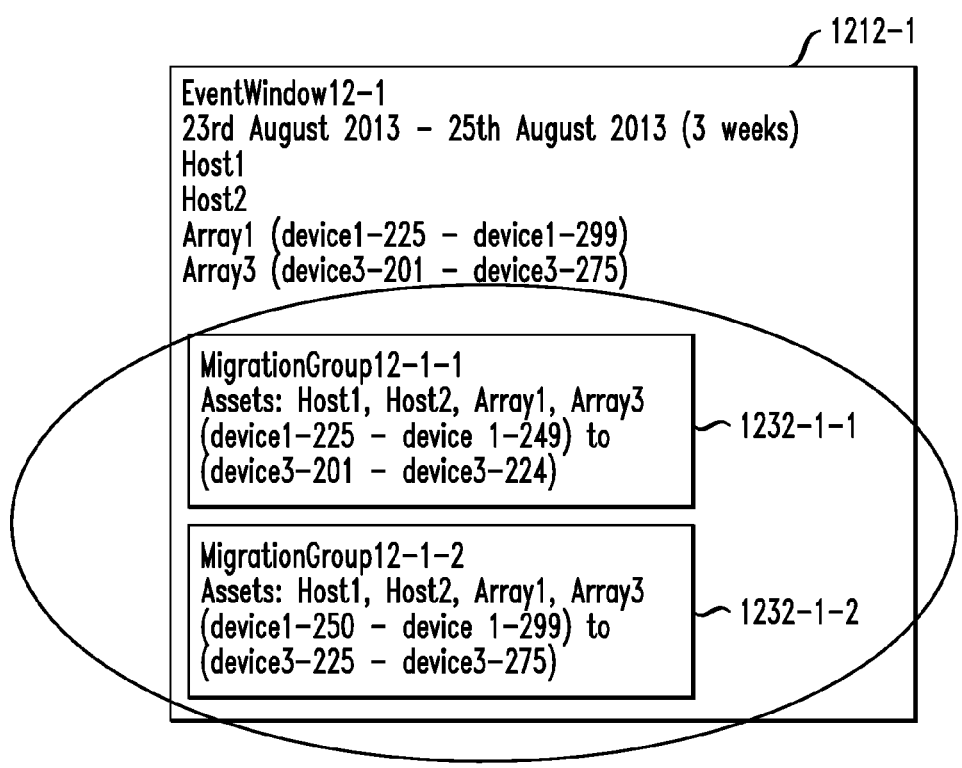
FIG. 12 illustrates updates to an event window in accordance with an embodiment of the present invention.
Figure 13:
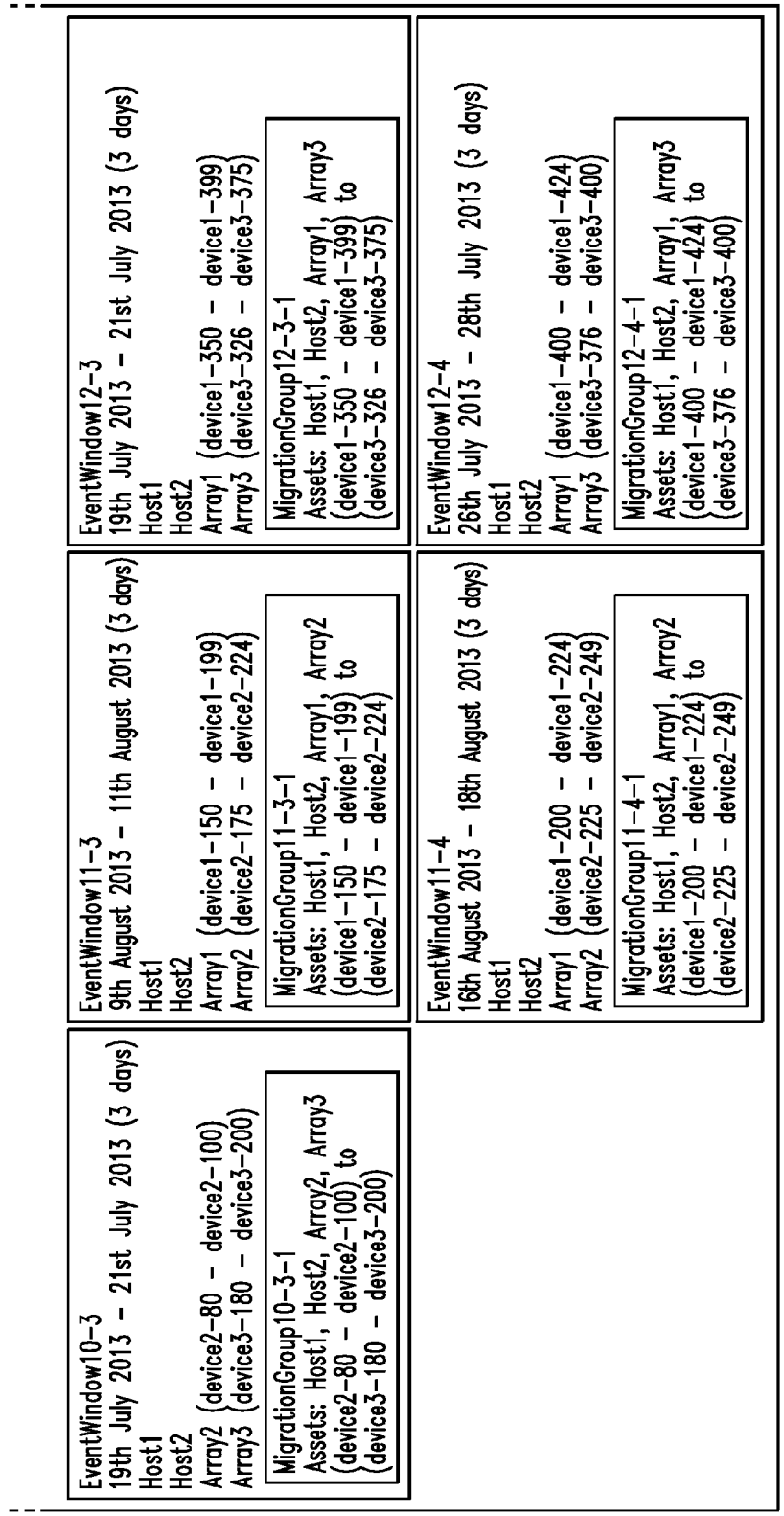
FIG. 13 illustrates event windows in connection with the more detailed view from FIG. 9, including an updated event window in accordance with an embodiment of the present invention.

According to the hypothetical of Example 4, after reviewing the workflow, it has been identified that some of the devices in EventWindow12-1 1212-1 should be migrated using a separate migration technology. Referring to FIG. 12, which illustrates updates to EventWindow12-1 1212-1 in a migration to be performed in accordance with an embodiment of the present invention, MigrationGroup12-1-1 1232-1-1 is used to migrate from (device1-225-device1-249) to (device3-201-device2-224), and new MigrationGroup12-1-2 1232-1-2 is used to migrate from (device1-250-device1-299) to (device3-225-device2-275). In accordance with an embodiment of the present invention, all configuration changes that have been made as part of migration planning are preserved when moving the devices from MigrationGroup12-1-1 1232-1-1 to MigrationGroup12-1-2 1232-1-2. FIG. 13 illustrates event windows in connection with the more detailed view from FIG. 9, including updated EventWindow 12-1 1312-1, in accordance with an embodiment of the present invention.

According to the hypothetical of Example 4, after further review of the workflow, it is decided new MigrationGroup12-1-2 should be moved to EventWindow12-4. FIG. 14 illustrates the change to eliminate the MigrationGroup 12-1-2 1432-1-2 from EventWindow 12-1 1412-1 and adding MigrationGroup 12-1-2 1432-1-2 to EventWindow12-4 1412-4 in accordance with an embodiment of the present invention. FIG. 15 illustrates event windows in connection with the more detailed view from FIG. 12, including updated EventWindows 12-1 1512-1 and 12-4 1512-4, in accordance with an embodiment of the present invention.

In the last step MigrationGroup12-1-2 was moved to EventWindow12-4. Event Window12-4 contains both Array1 and Array3. As a result it was possible to move MigrationGroup 12-1-2 to EventWindow12-4 and still maintain the association between (device1-250-device1-299) and (device3-226-device3-275) in MigrationGroup12-1-2. If MigrationGroup12-1-2 had been moved, for example, to EventWindow 11-3, it would not have automatically been possible to keep the association because Array3 is not part of EventWindow1 1-3.

In accordance with an embodiment, a possible option that could be used to work around the issue of moving a migration group to an event window not including a needed asset include, for example, Automatically or on manual prompt adding the needed asset (e.g., Array3) to the event window (e.g., EventWindow1 1-3). Another possibility is moving configurations relating only to the asset(s) present in the destination event window (e.g., Array1 (device1-250-device1-299)) in the migration group to the destination event window, resulting in a loss of all migration planning. In another alternative, only allow migration groups to be moved to an event window that contains all of the assets in the migration group. In this case, Array3 would need to be added to EventWindow1 1-3 before MigrationGroup12-1-2 is added to EventWindow1 1-3.

As each Migration Group is managed as a unit, the output when performing tasks may be different depending on the Event Window the Migration Group is moved to. For example, the following Table 1 illustrates the difference between moving to an Event Window that contains Asset3 and one that does not.

runbook instructions, etc. relating to MigrationGroup12-1-2 would no longer be created in EventWindow12-4.

In accordance with embodiments of the present invention, it is also possible to move assets from one migration group to another, e.g., move (device1-350-device1-374) from MigrationGroup 12-3-1 to MigrationGroup 11-3-1. In this case it would not be possible to move the association to (device3-326-device3-350) in MigrationGroup12-3-1 to MigrationGroup 11-3-1 because Array3 is not part of EventWindow1 1-3. If devices (device1-350-device1-374) were, however, moved to MigrationGroup12-3-1, it would be possible to keep the association to (device3-326-device3-350) because Array3 is in EventWindow12-3. This is similar to moving Migration Groups from one Event Window to another.

FIG. 16 is a flow chart showing a method for the development of a workflow for migration planning, in accordance with an embodiment of the present invention. Unless otherwise stated, the order or number of steps set forth in FIG. 16 is not necessarily limited to what is shown, and may be subject to change. It should be understood that the structure of the flow chart set forth in FIG. 16 be viewed as exemplary rather than as a requirement or limitation of the invention.

Referring to FIG. 16, the method comprises, at block 1601, generating a plurality of elements representing events of a workflow (e.g., event windows). Each event window, having a start time/date and end time/date, is active for a predetermined duration. At block 1603, the method further includes assigning to each element a group of one or more assets to be migrated as a unit (e.g., migration group), and at block 1607, moving a group of the one or more assets from a first element of the plurality of elements to a second element of the plurality of elements. Prior to moving, at block 1604, it is determined if the second/destination ele-

TABLE 1

| Task | MigrationGroup12-1-2 is in EventWindow12-4 | MigrationGroup12-1-2 is in EventWindow11-3 |
|---|---|---|
| Rules | "Masking is not setup correctly for device3-226" "Open Replicator is not setup correctly between device1-250 and device3-226" | "device1-250 does not have any planned device associated to it" "device1-251 does not have any planned device associated to it" |
| Scripts | Migration scripts moving data from (device1-250-device1-299) to (device3-226-device3-275) Configuration scripts for (device1-250-device1-299) Configuration scripts for (device3-226-device3-275) | Configuration scripts for (device1-250-device1-299) |
| Runbook | Instructions to migrate from (device1-250- device1-299) to (device3-226 - device3-275) Instructions to configure (device1-250-device1-299) Instructions to configure (device3-226 device3-275) General workflow instructions Cleanup instructions to complete after migration is complete | Instructions to configure (device1-250-device1-299) General workflow instructions |
| PM Reports/ Configuration Guides/ | Contain information for migrating between (device1-250-device1-299) to (device3-226-device3-275) Contains information on Array1 and (device1-250-device1-299) Contains information on Array3 and (device3-226-device3-275) General workflow instructions | Contains information on Array1 and (device1-250-device 1-299) General workflow instructions |

If, for example, MigrationGroup12-1-2 is moved from EventWindow12-4 to EventWindow1 1-3, the rules, scripts, ment includes the assets of the migration group. At block 1605, a move of the group of the one or more assets from the first element to the second element is rejected if it is determined that the second element lacks the one or more assets of the group. If the second element has the assets, then the move can take place.

The method may further comprise at block 1613, changing an order of activity of one or more of the elements, wherein the changing causes at least two elements of the plurality of elements to run in parallel. Prior to the changing, at block 1609, it is determined whether at least two elements to run in parallel because of a reordering use the same assets. If they use the same assets, the reordering is rejected at block 1611. In accordance with an embodiment of the present invention, the re-order should only be rejected if there is no way to restrict access to sub-assets of the asset. For example, the same switch could be in overlapping event windows if it was possible to restrict access to switch ports in overlapping event windows. A first Event window, for example, could have access to port 1 to port 49, and a second Event Window could have access to port 50 to port 99. In this case the overlap is resolved. When a zone is created in either of the two event windows, a system could be aware of the existing zones in both event windows and ensure that duplicates are not created. If the two elements to run in parallel do not use the same assets, the reordering is permitted and the method proceeds to block 1613.

The method may further comprise at block 1615, dividing at least one element of the plurality of elements into a plurality of sub-elements, wherein each of the sub-elements is active for a duration shorter than a duration of activity of the divided element, and at blocks 1617 and 1619, respectively, dividing the group of the one or more assets to be migrated as the unit into a plurality of sub-groups of the one or more assets, and moving a first one of the sub-groups to a different element from a second one of the sub-groups.

Figure 17:
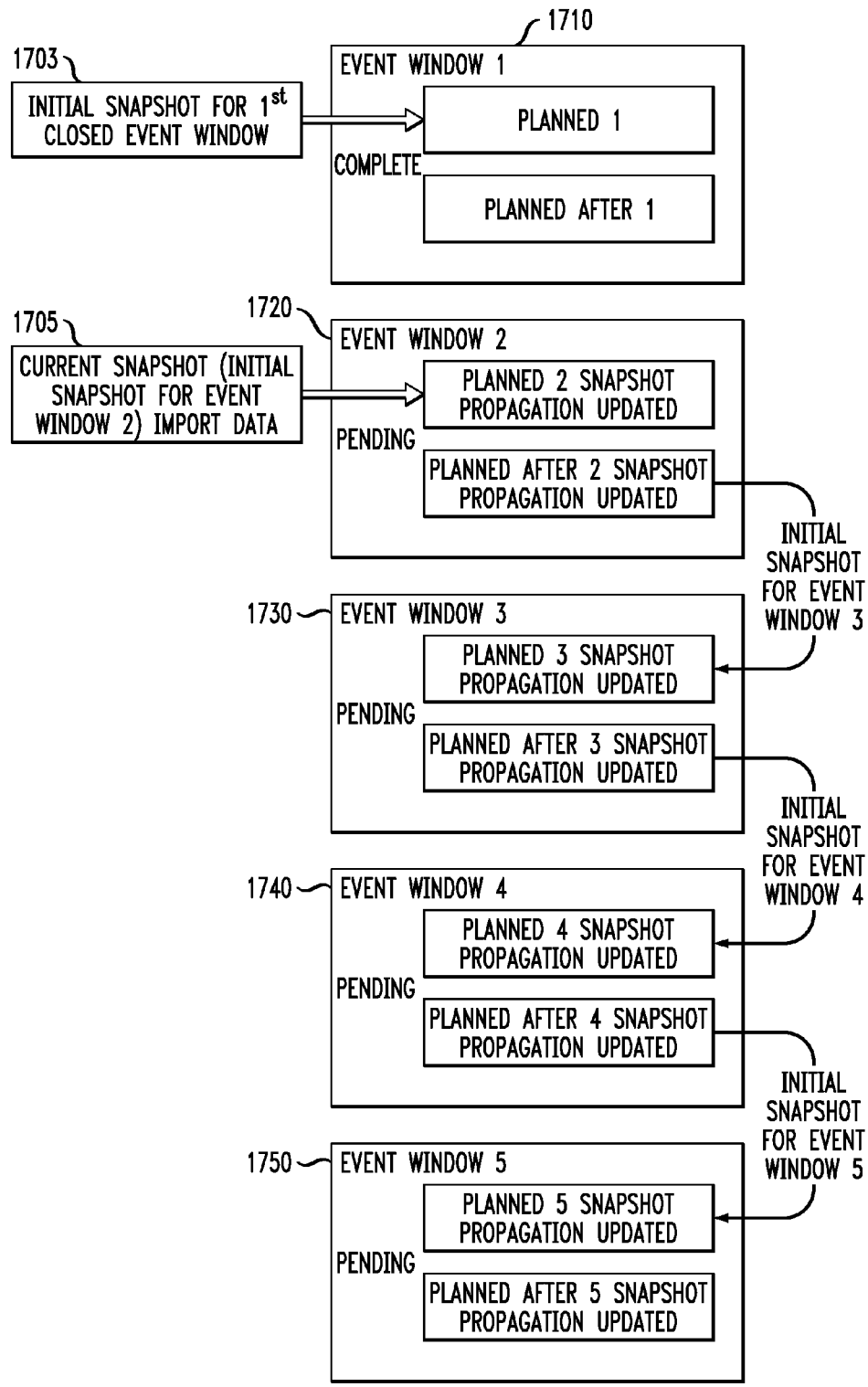
FIG. 17 shows a snapshot methodology associated with a data management system in accordance with an embodiment of the present invention.

FIG. 17 shows a snapshot methodology 1700 and illustrates a scenario where data from the data storage system 110 is imported into a current state snapshot 1702. In accordance with an embodiment of the present invention, new imports are only be imported into a current state snapshot, and the imported data will overwrite existing data the current state snapshot. For example, if a user re-imports a Symmetrix® array which already exists in the current state snapshot, the array in the current state snapshot is overwritten. Various techniques may be used for importing data into a current snapshot, including, but not limited to storage array network (SAN) summary, network shared disk (NSD) S, CLARIION, host comma separated value (CSV), HITACHI data systems (HDS), etc.

As can be seen in FIG. 17, in accordance with an embodiment, when data is imported into the current state snapshot, all snapshots that are in pending event windows are updated with the changes that have been made to the current snapshot. FIG. 17 provides an example of how the updates are propagated. For example, in the first column, the data imported into the current state snapshot 1702 is applied to the migration state snapshot 1712 and production state snapshot 1714, and from production state snapshot 1714 to migration state snapshot 1722 as the initial snapshot for event window 1720, and so on through each of the pending windows 1710, 1720, 1730, 1740 and 1750 until the updating is completed.

In the second column, the first event window 1710 is closed/complete, and the remaining event windows 1720, 1730, 1740 and 1750 are pending. In accordance with an embodiment of the present invention, the initial snapshot 1703 for the event window 1710 in column 2 is a copy of the current snapshot at the time of or prior to the event window being closed. The initial snapshot of the first pending event window 1720 in the second column is the current snapshot 1705 which includes the imported data from the data storage system 110. Therefore, the data imported into the current snapshot 1705 is applied to the migration state snapshot 1722 and production state snapshot 1724, and from production state snapshot 1724 to migration state snapshot 1732 as the initial snapshot for event window 1730, and so on through each of the pending windows 1720, 1730, 1740 and 1750 is completed.

As a result, the imported data is directly imported into only the current snapshots, and not into the migration or production state snapshots, only reaching the migration and production state snapshots through the propagation techniques described herein.

Figure 18:
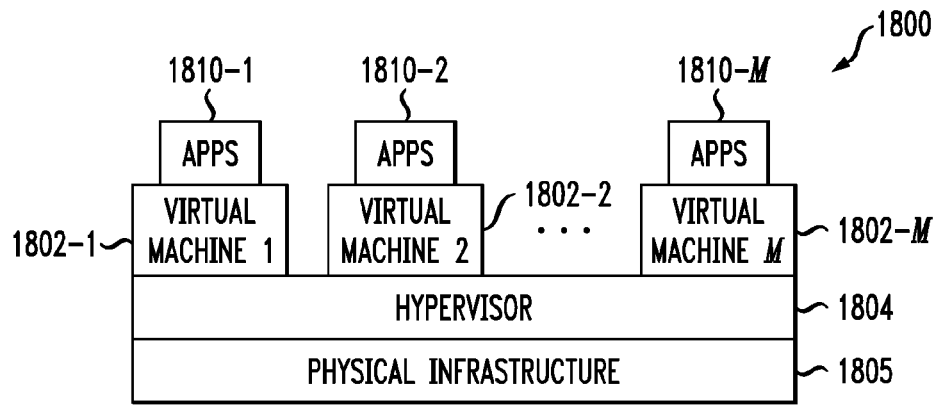
FIGS. 18 and 19 show examples of processing platforms that may be utilized to implement at least a portion of the systems of FIGS. 1 and 2.

As shown in FIG. 18, the cloud infrastructure 1800 comprises virtual machines (VMs) 1802-1, 1802-2, . . . 1802-M implemented using a hypervisor 1804. The hypervisor 1804, as mentioned above, is an example of what is more generally referred to herein as "virtualization infrastructure." The hypervisor 1804 runs on physical infrastructure 1805 (e.g., such as may include CPUs and/or storage devices). The cloud infrastructure 1800 further comprises sets of applications 1810-1, 1810-2, . . . 1810-M running on respective ones of the virtual machines 1802-1, 1802-2, . . . 1802-M (utilizing associated logical units (LUNs)) under the control of the hypervisor 1804.

Although only a single hypervisor 1804 is shown in the example of FIG. 18, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 1804 which, as shown in FIG. 18, is directly inserted on top of the computer hardware in order to allocate hardware resources of the physical computer (physical infrastructure 1805) dynamically and transparently. The hypervisor 1804 affords the ability for multiple operating systems to run concurrently on a single physical computer and share hardware resources with each other. The hypervisor 1804 thus also manages disk I/O scheduling associated with the workloads performed by each virtual machine.

An example of a commercially available hypervisor platform that may be used to implement portions of the cloud infrastructure 1800 in one or more embodiments of the invention is the VMware® vSphere® which may have an associated virtual infrastructure management system such as the VMware® vCenter™. The underlying physical infrastructure 1805 may comprise one or more distributed processing platforms that include storage products such as VNX and Symmetrix® VMAX, both commercially available from EMC Corporation of Hopkinton, Mass. A variety of other storage products may be utilized to implement at least a portion of the cloud infrastructure 1800.

Figure 19:
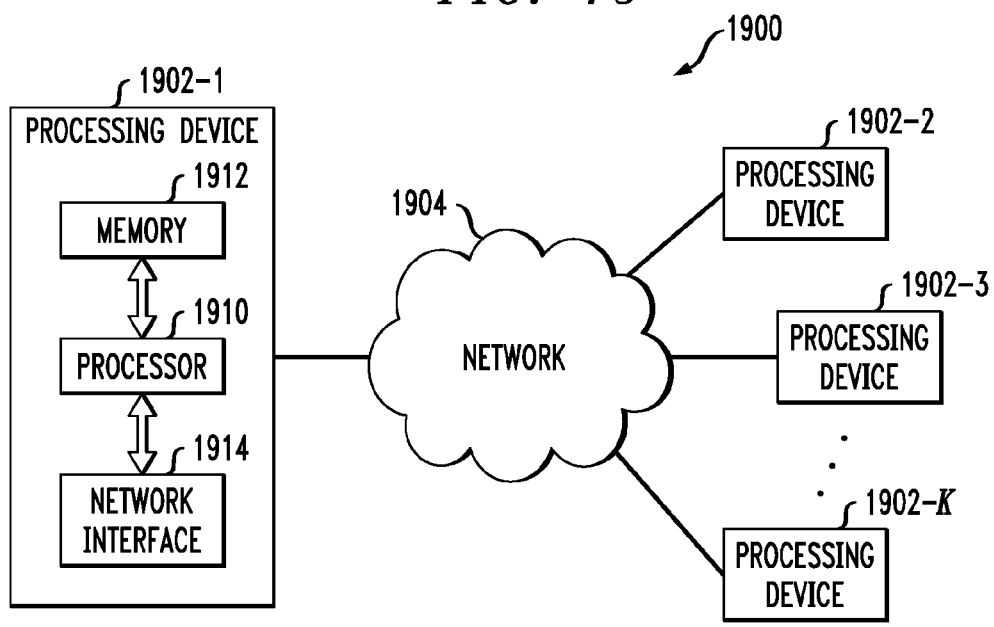

An example of a processing platform on which the cloud infrastructure 1800 and/or the workflow and data management system 140 and migration planning engine 142 of FIG. 1 may be implemented is processing platform 1900 shown in FIG. 19. The processing platform 1900 in this embodiment comprises at least a portion of the system 100 and includes a plurality of processing devices denoted 1902-1, 1902-2, 1902-3, . . . 1902-K, which communicate with one another over a network 1904. One or more of the elements of system 100 may therefore each run on one or more computers or other processing platform elements, each of which may be viewed as an example of what is more generally referred to herein as a "processing device." As illustrated in FIG. 19, such a device generally comprises at least one processor 1910 and an associated memory 1912, and implements one or more functional modules for controlling certain features of system 100. Again, multiple elements or modules may be implemented by a single processing device in a given embodiment.

The processing device 1902-1 in the processing platform 1900 comprises a processor 1910 coupled to a memory 1912. The processor 1910 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 1910. Memory 1912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1912 may comprise electronic memory such as random access memory (RAM), read-only memory (ROM) or other types of memory, in any combination. The one or more software programs when executed by a processing device such as the processing device 1902-1 causes the device to perform functions associated with one or more of the elements of system 100. One skilled in the art would be readily able to implement such software given the teachings provided herein. Other examples of processor-readable storage media embodying embodiments of the invention may include, for example, optical or magnetic disks.

Processing device 1902-1 also includes network interface circuitry 1914, which is used to interface the server with the network 1904 and other system components. Such circuitry may comprise conventional transceivers of a type well known in the art.

The other processing devices 1902 of the processing platform 1900 are assumed to be configured in a manner similar to that shown for processing device 1902-1 in the figure.

The processing platform 1900 shown in FIG. 19 may comprise additional known components such as batch processing systems, parallel processing systems, physical machines, virtual machines, virtual switches, storage volumes, logical units, etc. Again, the particular processing platform shown in FIG. 19 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, the embodiments of the present invention provide for management of assets as a unit (e.g., in a migration group). In accordance with embodiments of the present invention, assets are able to be moved between event windows, and work can be moved between migration groups that are in the same event window and also in different event windows. By using event windows and migration groups it is possible facilitate workflow planning for running tasks in parallel, modifying an order of tasks, and re-using assets that become available when a task is complete in a particular event window, e.g., if a user migrates data from a device in one event window, this device is available to use in subsequent event windows.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   generating a plurality of event windows representing events of a workflow, wherein each event window of the plurality of event windows is active for a predetermined duration;
   assigning, to each event window of the plurality of event windows, one or more assets to be migrated as a unit; and
   determining whether to move a group of the one or more assets from a first event window of the plurality of event windows to a second event window of the plurality of event windows;
   wherein determining whether to move the group from the first event window to the second event window comprises determining whether the second event window includes the one or more assets of the group;
   wherein the movement of the group from the first event window to the second event window is rejected if it is determined that the first event window lacks at least one of the one or more assets of the group; and
   wherein the steps of the method are executed via at least one processor coupled to a memory.

2. The method of claim 1, wherein at least two of the plurality of event windows are active at a same time.

3. The method of claim 1, further comprising changing an order of activity of one or more of the event windows, wherein the change of the order of activity causes at least two event windows of the plurality of event windows to run in parallel.

4. The method of claim 3, further comprising determining, prior to the change of the order of activity, whether the at least two event windows to run in parallel each include representations of the same assets.

5. The method of claim 3, wherein the change of the order of activity modifies the workflow.

6. The method of claim 1, wherein an event window of the plurality of event windows includes at least two snapshots overlapping with each other in time.

7. The method of claim 1, further comprising dividing a given event window of the plurality of event windows having a given predetermined duration into a plurality of sub-windows, wherein each of the sub-windows is active for a duration shorter than the given predetermined duration.

8. The method of claim 1, further comprising:
dividing the group of the one or more assets into a first sub-group of the one or more assets and a second sub-group of the one or more assets; and
moving the first sub-group to a different event window from the second sub-group.

9. The method of claim 1, wherein the predetermined duration comprises a start time and an end time.

10. The method of claim 1, wherein the movement of the group modifies the workflow.

11. A method comprising:
generating a plurality of event windows representing events of a workflow, wherein each event window of the plurality of event windows is active for a predetermined duration;
assigning, to each event window of the plurality of event windows, one or more assets to be migrated as a unit; and
determining whether to change an order of activity of one or more of the event windows, wherein the change of the order of the activity causes at least two event windows of the plurality of event windows to run in parallel;
wherein determining whether to change the order of activity of the one or more of the event windows comprises determining whether the at least two event windows to run in parallel each include representations of the same assets;
wherein the change of the order of activity is rejected if it is determined that the at least two event windows each include the representations of the same assets; and
wherein the steps of the method are executed via at least one processor coupled to a memory.

12. The method of claim 11, wherein at least two of the plurality of event windows are active at a same time.

13. The method of claim 11, wherein an event window of the plurality of event windows includes at least two snapshots overlapping with each other in time.

14. The method of claim 11, further comprising dividing a given event window of the plurality of event windows having a given predetermined duration into a plurality of sub-windows, wherein each of the sub-windows is active for a duration shorter than the given predetermined duration.

15. A computer program product comprising a processor-readable storage medium having encoded therein executable code of one or more software programs, wherein the one or more software programs when executed by at least one processor implement the steps of:
generating a plurality of event windows representing events of a workflow, wherein each event window of the plurality of event windows is active for a predetermined duration;
assigning, to each event window of the plurality of event windows, one or more assets to be migrated as a unit; and
determining whether to move a group of the one or more assets from a first event window of the plurality of event windows to a second event window of the plurality of event windows;
wherein determining whether to move the group from the first event window to the second event window comprises determining whether the second event window includes the one or more assets of the group; and
wherein the movement of the group from the first event window to the second event window is rejected if it is determined that the first event window lacks at least one of the one or more assets of the group.

16. The computer program product of claim 15, wherein the one or more software programs when executed by the at least one processor further implement the step of changing an order of activity of one or more of the event windows, wherein the change of the order of activity causes at least two event windows of the plurality of event windows to run in parallel.

17. An apparatus comprising:
a memory; and
a processor operatively coupled to the memory and configured to:
generate a plurality of event windows representing events of a workflow, wherein each event window of the plurality of event windows is active for a predetermined duration;
assign, to each event window of the plurality of event windows, one or more assets to be migrated as a unit; and
determine whether to move a group of the one or more assets from a first event window of the plurality of event windows to a second event window of the plurality of event windows;
wherein, in determining whether to move the group from the first event window to the second event window, the processor is configured to determine whether the second event window includes the one or more assets of the group; and
wherein the processor is further configured to reject the movement of the group from the first event window to the second event window if it is determined that the first event window lacks at least one of the one or more assets of the group.

18. The apparatus of claim 17, wherein at least two of the plurality of event windows are active at a same time.

19. The apparatus of claim 17, wherein the processor is further configured to change an order of activity of one or more of the event windows, wherein the change of the order of activity causes at least two event windows of the plurality of event windows to run in parallel.

20. The apparatus of claim 19, wherein the processor is further configured to determine, prior to the change of the order of activity, whether the at least two event windows to run in parallel each include representations of the same assets.

21. The apparatus of claim 17, wherein the processor is further configured to divide a given event window of the plurality of event windows having a given predetermined duration into a plurality of sub-windows, and wherein each of the sub-windows is active for a duration shorter than the given predetermined duration.

22. The apparatus of claim 17, wherein the processor is further configured to:

divide the group into a first sub-group of the one or more assets and a second sub-group of the one or more assets; and move the first sub-group to a different event window from the second sub-group.

23. An apparatus comprising:

a memory; and a processor operatively coupled to the memory and configured to:

generate a plurality of event windows representing events of a workflow, wherein each event window of the plurality of event windows is active for a predetermined duration;

assign, to each event window of the plurality of event windows, one or more assets to be migrated as a unit; and determine whether to change an order of activity of one or more of the event windows, wherein the change of the order of the activity causes at least two event windows of the plurality of event windows to run in parallel;

wherein, in determining whether to change the order of activity of the one or more of the event windows, the processor is configured to determine whether the at least two event windows to run in parallel each include representations of the same assets; and wherein the processor is further configured to reject the change of the order of activity if it is determined that the at least two event windows each include the representations of the same assets.

* * * * *